United States Patent
Knight

(10) Patent No.: US 9,135,031 B1
(45) Date of Patent: Sep. 15, 2015

(54) SYSTEM AND METHOD FOR DETERMINING STORAGE RESOURCES OF A VIRTUAL MACHINE IN A VIRTUAL SERVER ENVIRONMENT

(75) Inventor: Clinton D. Knight, Apex, NC (US)

(73) Assignee: NetApp, Inc., Sunnyvale, CA (US)

( * ) Notice: Subject to any disclaimer, the term of this patent is extended or adjusted under 35 U.S.C. 154(b) by 649 days.

(21) Appl. No.: 12/769,526

(22) Filed: Apr. 28, 2010

(51) Int. Cl.
*G06F 9/455* (2006.01)
*G06F 9/46* (2006.01)
*G06F 15/173* (2006.01)
*G06F 9/50* (2006.01)

(52) U.S. Cl.
CPC ............ *G06F 9/455* (2013.01); *G06F 9/45558* (2013.01); *G06F 9/50* (2013.01); *G06F 9/505* (2013.01); *G06F 9/5005* (2013.01); *G06F 9/5027* (2013.01); *G06F 9/5044* (2013.01); *G06F 9/5061* (2013.01); *G06F 9/5072* (2013.01); *G06F 9/5077* (2013.01); *G06F 9/5083* (2013.01); *G06F 9/5088* (2013.01)

(58) Field of Classification Search
USPC ............................... 718/1, 100, 104; 709/226
See application file for complete search history.

(56) References Cited

U.S. PATENT DOCUMENTS

| | | | | |
|---|---|---|---|---|
| 5,652,873 A | * | 7/1997 | Fecteau et al. | 703/23 |
| 6,075,938 A | * | 6/2000 | Bugnion et al. | 703/27 |
| 7,203,730 B1 | * | 4/2007 | Meyer et al. | 709/213 |
| 7,577,722 B1 | * | 8/2009 | Khandekar et al. | 709/220 |
| 7,606,868 B1 | * | 10/2009 | Le et al. | 709/211 |
| 7,734,712 B1 | * | 6/2010 | Meyer et al. | 709/213 |
| 8,095,525 B2 | * | 1/2012 | Le et al. | 707/705 |
| 8,291,159 B2 | * | 10/2012 | Rajagopal et al. | 711/111 |
| 2005/0091365 A1 | * | 4/2005 | Lowell et al. | 709/224 |
| 2009/0077552 A1 | * | 3/2009 | Sekiguchi et al. | 718/1 |
| 2009/0089504 A1 | * | 4/2009 | Soran et al. | 711/114 |
| 2009/0172666 A1 | * | 7/2009 | Yahalom et al. | 718/1 |
| 2009/0282404 A1 | * | 11/2009 | Khandekar et al. | 718/1 |
| 2009/0328225 A1 | * | 12/2009 | Chambers et al. | 726/26 |
| 2010/0070725 A1 | * | 3/2010 | Prahlad et al. | 711/162 |
| 2010/0115049 A1 | * | 5/2010 | Matsunaga et al. | 709/216 |
| 2010/0138208 A1 | * | 6/2010 | Hattori et al. | 703/25 |
| 2010/0169884 A1 | * | 7/2010 | Bogin et al. | 718/1 |
| 2010/0235832 A1 | * | 9/2010 | Rajagopal et al. | 718/1 |
| 2010/0241673 A1 | * | 9/2010 | Wu et al. | 707/812 |
| 2010/0306445 A1 | * | 12/2010 | Dake | 711/6 |
| 2011/0179414 A1 | * | 7/2011 | Goggin et al. | 718/1 |
| 2011/0239213 A1 | * | 9/2011 | Aswani et al. | 718/1 |

\* cited by examiner

*Primary Examiner* — Charles Swift
(74) *Attorney, Agent, or Firm* — Kacvinsky Daisak Bluni, PLLC

(57) ABSTRACT

Described herein are systems and methods for determining relationships of storage resources allocated for use to a virtual machine (VM) in a virtual server environment. In some embodiments, a VM storage resource module residing and executing on a server may be configured to determine one or more storage resources (residing on one or more storage systems) of one or more VMs. In these embodiments, the VM storage resource module may determine storage resource information describing the storage resources used by a VM. The storage resource information may then be used to locate and access the storage resources residing on the one or more storage systems for various monitoring, maintenance, or optimizing purposes.

24 Claims, 10 Drawing Sheets

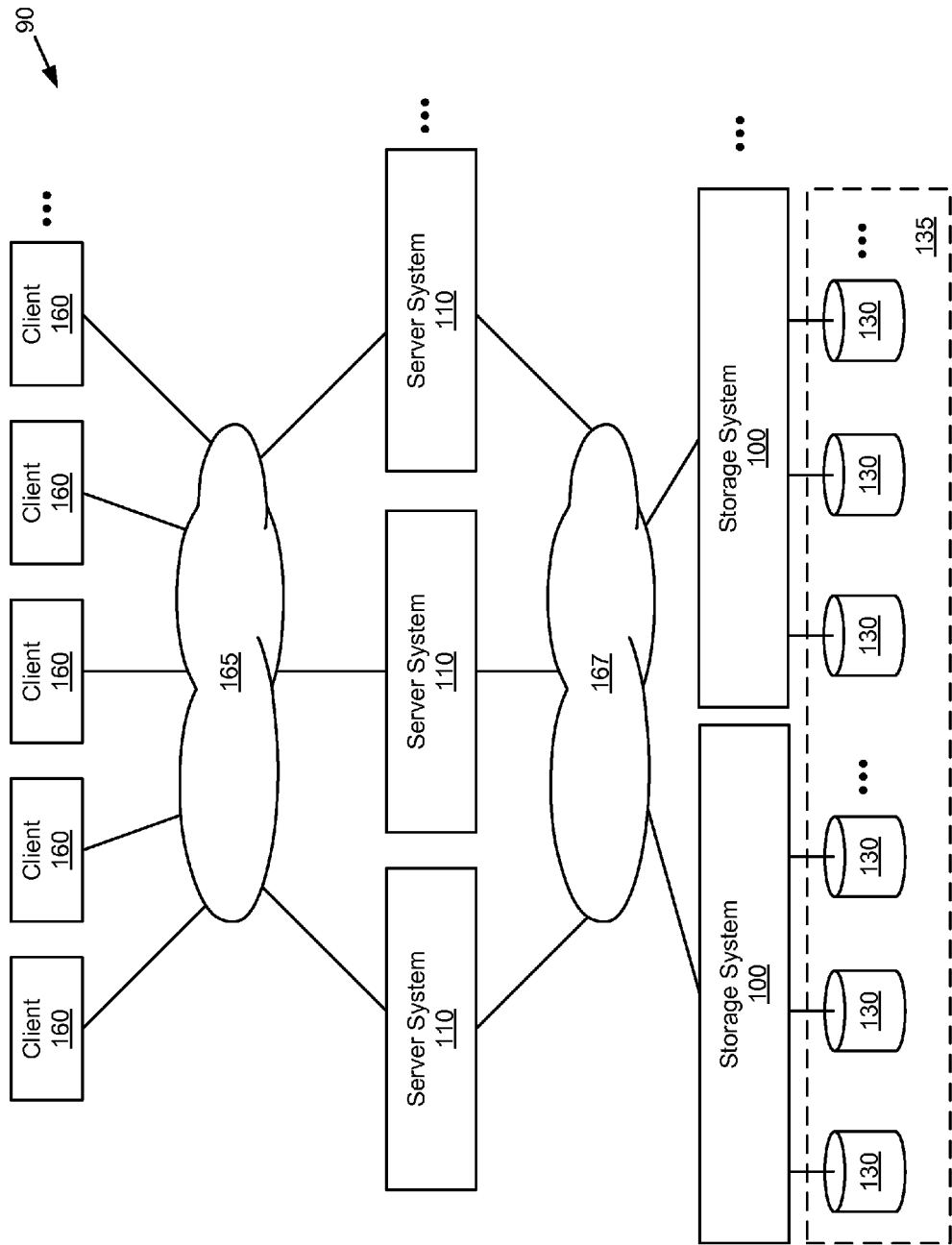

| VM GUID | Type | Device Name or Disk Path | Storage Resource Information |
|---|---|---|---|
| VM1 | VHD | DP1 | |
| VM1 | VHD | DP2 | |
| VM1 | PTD | DN1 | |
| ... | | ... | |
| VM2 | VHD | DP3 | |
| VM2 | PTD | DN4 | |
| VM2 | PTD | DN5 | |
| ... | | ... | |

FIG. 7

| Device Name | Disk Path | Storage Resource Information |
|---|---|---|
| DNX | DPX | Storage system name and network address, volume name, storage resource name, etc. |
| DNY | DPY | Storage system name and network address, volume name, storage resource name, etc. |
| DNZ | DPZ | Storage system name and network address, volume name, storage resource name, etc. |
| ... | | |

FIG. 8

| VM GUID | Type | Device Name or Disk Path | Storage Resource Information |
|---------|------|--------------------------|------------------------------|
| VM1 | VHD | DP1 | Storage system name and network address, volume name, storage resource name, etc. |
| VM1 | VHD | DP2 | Storage system name and network address, volume name, storage resource name, etc. |
| VM1 | PTD | DN1 | Storage system name and network address, volume name, storage resource name, etc. |
| ... | | ... | |
| VM2 | VHD | DP3 | Storage system name and network address, volume name, storage resource name, etc. |
| VM2 | PTD | DN4 | Storage system name and network address, volume name, storage resource name, etc. |
| VM2 | PTD | DN5 | Storage system name and network address, volume name, storage resource name, etc. |

FIG. 9

SYSTEM AND METHOD FOR DETERMINING STORAGE RESOURCES OF A VIRTUAL MACHINE IN A VIRTUAL SERVER ENVIRONMENT

FIELD OF THE INVENTION

The present invention relates to virtual server environments and, more specifically, to determining storage resources of a virtual machine in a virtual server environment.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The storage system may be further configured to allow many server systems to access shared resources, such as files, stored on storage devices of the storage system. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow servers to remotely access the information (files) on the storage system. The servers typically communicate with the storage system by exchanging discrete frames or packets of data according to pre-defined protocols, such as the Transmission Control Protocol/Internet Protocol (TCP/IP).

NAS systems generally utilize file-based access protocols; therefore, each server may request the services of the storage system by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the storage system may be enhanced for networking servers.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus." In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

A SAN arrangement or deployment allows decoupling of storage from the storage system, such as an application server, and some level of information storage sharing at the application server level. There are, however, environments wherein a SAN is dedicated to a single server. In some SAN deployments, the information is organized in the form of databases, while in others a file-based organization is employed. Where the information is organized as files, the server requesting the information maintains file mappings and manages file semantics, while its requests (and server responses) address the information in terms of block addressing on disk using, e.g., a logical unit (LU) having a logical unit number (LUN). Some SAN arrangements utilize storage systems that implement virtual disks (vdisks), which are encapsulated data containers stored within a file system.

In multi-protocol storage systems that utilize both block-based and file-protocols, typically the block-based protocol utilizes a high-speed transport mechanism, such as Fibre Channel (FC) or InfiniBand (IB). Conversely, file-based protocol connections often utilize, for example, the NFS protocol operating over TCP/IP. The file-based systems typically include additional network overhead due to the nature of the file-based protocols, e.g., NFS or User Datagram Protocol (UDP), involved. This additional network overhead, from, for example, file mapping and management of file semantics, significantly reduces the data throughput available over the file-based protocol network connection.

Users typically desire the ease of use of a file-based protocol, especially the use of the file-based protocol namespace wherein the files are referenced through a conventional drive/volume/path/file name mechanism. In contrast, in a SAN or other block-based environment, data is accessed by reference to a set number of blocks spread among the disks storing the data for the data set, which imposes a greater administrative burden on a user for using SAN-based systems. However, a noted disadvantage of the use of the file-based protocols is the above-mentioned additional network overhead required for the use of such protocols. This additional network overhead makes the use of these file-based protocols impractical for certain high-performance and data-intensive transfer operations, such as database management systems (DBMS). Many users thus desire the ease of use of a file-based protocol namespace, while needing the high-speed data throughput available from a block-based protocol.

A virtual server environment may typically include multiple physical servers accessing the storage system having multiple storage devices for storing client data. Each server may include multiple virtual machines (VMs) that reside and execute on the server. Each VM (sometimes referred to as a virtual server or virtual desktop) may comprise a separate encapsulation or instance of a separate operating system and one or more applications that execute on the server. As such, each VM on a server may have its own operating system and set of applications and function as a self-contained package on the server and multiple operating systems may execute simultaneously on the server.

Each VM on a server may be configured to share the hardware resources of the server. Each server may include a VM monitor module/engine (sometimes referred to as a hypervisor module/engine) that executes on the server to produce and manage the VMs. The VM monitor module/engine (hypervisor) may also virtualize the hardware and/or software resources of the servers for use by the VMs. The operating system of each VM may utilize and communicate with the resources of the server via the VM monitor/hypervisor engine. The virtual server environment may also include a plurality of clients connected with each server for accessing client data stored on the storage system. Each client may connect and interface/interact with a particular VM of a server to access client data of the storage system. From the viewpoint of a client, the VM may comprise a virtual server that appears and behaves as an actual physical server or behaves as an actual desktop machine. For example, a single server may by "virtualized" into 1, 2, 4, 8, or more virtual servers or virtual desktops, each running their own operating systems, and each able to support one or more applications.

A storage system may be configured to allow servers to access its data, for example, to read or write data to the storage system. A server may execute an application that "connects" to the storage system over a computer network such as a shared local area network (LAN), a wide area network (WAN), or a virtual private network (VPN) implemented over a public network such as the Internet. The application may send an access request (read or write request) to the storage system for accessing particular data stored on the storage system. Each server may also include multiple VMs, each VM being used by and connected with a client through a computer network. Each VM may also execute an application for sending read/write requests (received from the connected client) for accessing data on the storage system. The VM applications executing on the server may service the connected clients by receiving the client access requests and submitting the access requests to the storage system for execution.

There are several advantages in implementing VMs on a server. Having multiple VMs on a single server enables multiple clients to use multiple different operating systems executing simultaneously on the single server. Also, multiple VMs executing their own applications may be logically separated and isolated within a server to avoid conflicts or interference between the applications of the different VMs. As each VM is separated and isolated from other VMs, a security issue or application crash in one VM does not affect the other VMs on the same server. Also, VMs can rapidly and seamlessly be shifted from one physical server to any other server, and optimally utilize the resources without affecting the applications. Such a virtualization of the servers, and/or virtualization of the storage network environment, allows for efficiency and performance gains to be realized.

As discussed above, the VM monitor module/engine (hypervisor) of a physical server may virtualize the hardware and/or software resources for use by the VMs. For each physical server these resources may include storage resources (e.g., logical units) distributed on one or more storage systems. Each storage system may allocate its storage resources to one or more physical servers, each allocated storage resource being "mounted" (i.e., made available) to a particular physical server. For example, a storage system may allocate one or more logical units (LUs) to a physical server, each LU being mounted and made available to the physical server. Each physical server may have one or more LUs available for use from one or more storage systems. A mounted storage resource may appear to the server as a direct-attached physical storage device, such as a direct-attached Small Computer System Interface (SCSI) or Serial ATA (SATA) disk device.

Some or all storage resources (e.g., LUs) that are made available to a physical server may be virtualized by the VM monitor module for use by the VMs. The VM monitor module may virtualize the storage resources by producing virtual storage components for use by the VMs and virtual storage information that describes these virtual storage components. For example, virtual storage components may comprise a virtual hard disk (VHD) or pass-through disk (PTD) allocated to a VM. For each VM, the VM monitor module may allocate one or more virtual storage components for use by the VM for accessing and storing data. The virtual storage information may be used by a VM to locate and access its virtual storage component(s).

To a VM, each virtual storage component may appear as a directly attached physical storage device (e.g., a drive or disk) that is directly accessed by the VM. But in fact, each virtual storage component is supported by an underlying corresponding storage resource residing somewhere on one of the storage systems. As used herein, an "underlying" storage resource corresponding to a virtual storage component comprises the storage resource on the storage system that stores the actual data for the virtual storage component. As such, data accesses (e.g., read/write accesses) to and from the virtual storage component by the VM ultimately comprises data accesses to and from the underlying storage resource corresponding to the virtual storage component.

However, in virtualizing the available storage resources for use by the VMs, the relationship between a VM and its underlying storage resources may be difficult to determine. This may be problematic for VM administrators or VM applications that need to monitor or optimize storage resources of VMs. For example, it may be desirable to monitor storage resources of a particular VM to determine if there are errors are being incurred or storage space needs to be increased for the particular VM. Monitoring storage resources of the storage systems in general may not be helpful in this regard as the particular storage resources of the VM are of interest. As such, there is a need for an improved method of determining storage resources (residing on one or more storage systems) used by a VM in a virtual server environment.

SUMMARY OF THE INVENTION

Described herein are systems and methods for determining relationships of storage resources allocated for use to a VM in a virtual server environment. In some embodiments, a VM storage resource module/engine residing and executing on a server may be configured to determine one or more storage resources (residing on one or more storage systems) of one or more VMs. In these embodiments, the VM storage resource module may determine storage resource information describing the storage resources used by a VM. The storage resource information may then be used to locate and access the storage resources residing on the one or more storage systems for various monitoring, maintenance, or performance optimization purposes.

In some embodiments, the VM storage resource module may determine storage resources of each VM on a server in a three-phase process. The three-phase process may be repeated for each server in the virtual server environment. As discussed above, the VM monitor module may virtualize the storage resources by producing virtual storage components (e.g., VHDs, PTDs, etc.) for use by the VMs and virtual storage information that describes these virtual storage components. In a first phase, the VM storage resource module may determine, for each VM on a server, all virtual storage components allocated to the VM and virtual storage information that describes each allocated virtual storage component. For each virtual storage component, the virtual storage information may include "connecting storage information" (associated with each virtual storage component) that may be used to later connect/correlate the virtual storage component with a storage resource on a storage system. In a second phase, the VM storage resource module may determine, for each storage resource available to a server, connecting storage information associated with the storage resource and storage resource information describing the storage resource. In a third phase, using the connecting storage information, the VM storage resource module may determine, for each virtual storage component used by a VM, a corresponding storage resource on a storage system that underlies the virtual storage component.

The first phase may further comprise a plurality of steps. For each server, the VM storage resource module may first determine a listing of all VMs hosted and executing on the server. For each listed VM, the VM storage resource module may then list all virtual storage components used by the VM. For each listed virtual storage component, the VM storage resource module may determine virtual storage information that describes the virtual storage component. The virtual storage information for a virtual storage component may comprise various information used by the VM to identify and locate the virtual storage component.

For example, for a virtual storage component comprising a VHD, the virtual storage information may comprise the operating system device path. For example, for a virtual storage component comprising a pass-through disk (PTD), the virtual storage information may comprise an operating system storage device identifier. For each virtual storage component, the virtual storage information may include a "connecting storage information." For example, for a VHD the connecting storage information may comprise the operating system storage path, and for a PTD the connecting storage information may comprise the operating system device identifier. The connecting storage information may be used to connect/correlate the virtual storage information discovered in the first phase with the storage resource information discovered in the second phase. In the embodiments described below, for illustrative purposes, the operating system device path may be referred to as a "disk path" and the operating system storage device identifier may be referred to as a "device name/handle." In other embodiments, the device path may comprise a different type of device path and the storage device identifier may comprise a different type of storage device identifier.

As such, the first phase produces connecting storage information associated with each virtual storage component of each VM on a server. The listing of all VMs on a server, the listing of all virtual storage components used by each VM, and the virtual storage information (including connecting storage information) for each virtual storage component may be stored to a "virtual storage component data structure."

The second phase may also comprise a plurality of steps. For each server, the VM storage resource module may first determine a listing of each storage resource available to the server. The listing may comprise a listing of connecting storage information associated with the available storage resources. For example, each storage resource may have an associated device name and disk path, whereby the listing of available storage resources may comprise a listing of the device names and disk paths associated with the available storage resources. The VM storage resource module may then determine, using the device names associated with the available storage resources, storage resource information describing each storage resource. The listing of each storage resource (comprising a listing of connecting storage information associated with the available storage resources) and storage resource information for each storage resource may be stored to a "storage resource data structure."

As discussed above, each storage resource made available (mounted) on a server may appear to the server as a direct-attached physical storage device, such as a direct-attached SCSI or SATA disk device. In some embodiments, the storage resource information for a storage resource is determined by sending a low-level device-access command (referred to as a "storage information" command) to the device name of the storage resource, the storage information command requesting the return of particular storage resource information. For example, the storage information command may comprise a disk-access command (such as a SCSI command) sent to the device name of the storage resource, whereby the appropriate storage resource receives and processes the command to return the requested storage resource information.

The received storage resource information of a storage resource may comprise various information used to identify and locate a storage resource on a storage system. For example, storage resource information for a particular storage resource hosted on a particular storage system may include a name/identifier and network address (IP address) of the storage system, name/identifier of the volume containing the storage resource, the name/identifier (e.g., LUN or serial number) of the storage resource, the operating system path of the storage resource (e.g., LU path), etc.

Note that the virtual storage information (determined in the first phase) may be used by a VM to locate and access a virtual storage component and can not use or understand storage resource information to directly access the storage resources. Virtual storage information of a virtual storage component typically does not specify which storage resource on a storage system corresponds to the virtual storage component. The storage system typically can not understand or use virtual storage information to locate the corresponding underlying storage resource. In contrast, the storage resource information of a storage resource may be used to identify and locate the storage resource on a particular storage system. However, it may be unclear which storage resource corresponds to which virtual storage component of which VM.

In the third phase, the VM storage resource module may determine, for each virtual storage component used by a VM, a corresponding storage resource on a storage system that underlies the virtual storage component. As such, in the third phase, the VM storage resource module may determine, for each VM, the storage resources residing on one or more storage systems that are allocated for and used by the VM. The VM storage resource module may do so by mapping the connecting storage information of each virtual storage component to a matching connecting storage information associated with a particular storage resource, the storage resource having the matching connecting storage information comprising the underlying storage resource that corresponds to the virtual storage component. For example, for a virtual storage component comprising a VHD having an operating system disk path, the VM storage resource module may determine/identify a storage resource having a matching associated operating system disk path, the storage resource thus corresponding to the virtual storage component. For example, for a virtual storage component comprising a PTD having an operating system device name/handle, the VM storage resource module may determine/identify a storage resource having a matching associated operating system device name/handle, the storage resource thus corresponding to the virtual storage component.

In the third phase, after determining each storage resource corresponding to each VM of the server, the VM storage resource module may then determine/identify the storage resource information (as determined in the second phase) for each storage resource used by each VM. The storage resource information for the storage resource corresponding to each virtual storage component of each VM of the server may be stored to the "virtual storage component data structure" (e.g., stored in the data structure entry of the corresponding virtual storage component).

The storage resource information may then be used to identify and locate the storage resources of a VM for any variety of purposes. For example, the storage resource information may be used for monitoring, providing maintenance, or optimizing of storage resources used by a particular VM. For example, it may be desirable to monitor storage resources used by a particular VM to determine if there are errors incurred in the storage resources or storage space needs to be increased in the storage resources. Monitoring all storage resources of all the storage systems in general may not be helpful in this regard as storage resources of a particular VM are of interest. As such, the use of the VM storage resource module may be advantageous as it may be used to provide monitoring, maintenance, or optimizing of storage resources based on the particular VM.

BRIEF DESCRIPTION OF THE DRAWINGS

The novel features are set forth in the appended claims. However, for purpose of explanation, several embodiments of the invention are set forth in the following figures.

FIG. 1A is a block diagram of an exemplary virtual server environment in which some embodiments operate;

FIG. 7 shows an exemplary virtual storage component data structure used in some embodiments;

FIG. 8 shows an exemplary storage resource data structure used in some embodiments; and FIG. 9 shows an exemplary virtual storage component data structure having storage resource information.

DETAILED DESCRIPTION

Figure 1B:
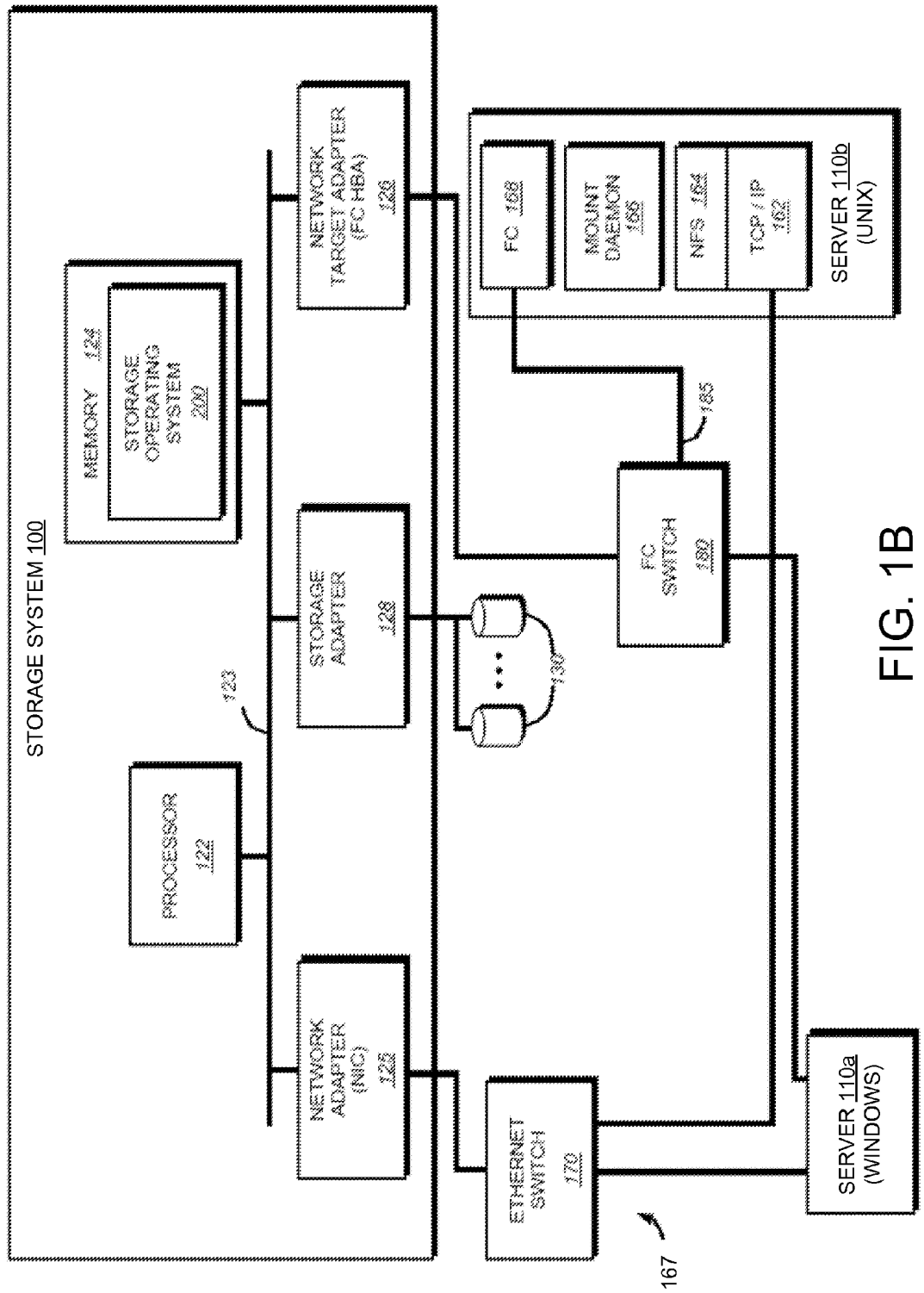
FIG. 1B is a schematic block diagram of a multi-protocol storage system used in some embodiments.

In the following description, numerous details are set forth for purpose of explanation. However, one of ordinary skill in the art will realize that the embodiments described herein may be practiced without the use of these specific details. In other instances, well-known structures and devices are shown in block diagram form in order to not obscure the description with unnecessary detail.

The description that follows is divided into two sections. Section I describes a virtual server environment in which some embodiments operate. Section II describes a method and system for determining storage resources of VMs in a virtual server environment.

I. Virtual Server Environment

FIG. 1A is a block diagram of an exemplary virtual server environment 90 in which some embodiments operate. The environment 90 comprises a set of two or more server systems 110 connected to one or more client systems 160 via a network 165. The server systems 110 may each access one or more storage systems 100 that are connected to the server systems 110 via a network 167. Each storage system 100 may comprise a set of storage devices 130 for storing client data, the storage devices 130 comprising a shared storage 135 of the storage system 100. Note that the server systems 110 are also connected to each other (e.g., via network 165 or network 167) for communicating with each other (e.g., for working collectively to provide data-access service to the client systems 160 and for collectively hosting a plurality of virtual machines as described herein).

A client system 160 may comprise a computer system that may execute a client application that interacts with a server system 110 for submitting configuration and/or read/write access requests and for receiving or transmitting data from or to the server systems 110 over the network 165. In a virtual server environment, a client system 160 may comprise a terminal that may execute a client terminal application that interacts over the network 165 with one or more virtual machines (VMs) executing on a server system 110 for submitting configuration and/or read/write access requests and for receiving or transmitting data from or to the storage system 100 over the network 167. A user may interface with the client application (e.g., through a user interface of the client application) to submit configuration and/or access requests.

A server system 110 may comprise a computer system that may execute a server application that interacts with the client systems 160 for receiving configuration and/or read/write access requests from, and for receiving or transmitting data from or to the client systems 160 over the network 165. A server system 110 may be connected to the client systems 160 over a network 165 such as a local area network (LAN), an Ethernet subnet, a PCI or PCIe subnet, a switched PCIe subnet, a wide area network (WAN), a metropolitan area network (MAN), the Internet, or the like. In some embodiments, a server system 110 may comprise a chassis hosting multiple instances of server systems 110, each server system 110 hosting multiple client systems embodied as virtual machines, one virtual machine per each client system 160. The network 165 and/or subnets of networks 165 may be physically embodied within such a chassis.

A server application executing on a server system 110 may provide data-access services to client systems 160 by receiving and processing access requests from the client systems 160 for data from the storage system(s) 100. In turn, a server application utilizes the services of the storage system 100 to access, store, and manage data in a set of storage devices 130. A storage system 100 may be coupled locally to a server system 110 over a network 167 such as a local area network (LAN), an Ethernet subnet, a PCI or PCIe subnet, a switched PCIe subnet, a wide area network (WAN), a metropolitan area network (MAN), the Internet, or the like. In some embodiments, a server system 110 may comprise a chassis hosting multiple instances of server systems 110 within a single chassis (e.g., a blade server chassis), with each instance of a server system 110 in communication with each other instance of a server system 110 in the chassis via network 167.

Interaction between the server systems 110 and the storage system(s) 100 can enable the provision of storage services. That is, the server systems 110 may request the services of the storage system(s) 100 (by submitting configuration and/or read/write access requests), and the storage system(s) 100 may respond to configuration and/or read/write access requests of the server systems 110 by receiving or transmitting data to the server systems 110 over the network 167 (e.g., by exchanging data packets through a connection over the network 167).

Communications between a storage system 100 and any of server systems 110 are typically embodied as packets sent over the computer network 167. A server system 110 may send an access request (a configuration and/or read/write access request) to the storage system 100 for accessing particular data stored on the storage system. The server system 110 may request the services of the storage system 100 by issuing storage-access protocol messages formatted in accordance with a conventional storage-access protocol for accessing storage devices (such as CIFS, NFS, etc.). Access requests (e.g., configuration and/or read/write access requests) may be implemented by issuing packets using file-based access protocols—such as the Common Internet File System (CIFS) protocol or Network File System (NFS) protocol—over the Transmission Control Protocol/Internet Protocol (TCP/IP) when accessing data in the form of files and directories. Alternatively, the server system 110 may issue access requests by issuing packets using block-based access protocols—such as the Fibre Channel Protocol (FCP), or Internet Small Computer System Interface (iSCSI) Storage Area Network (SAN) access—when accessing data in the form of blocks.

A server system 110 utilizes services of a storage system 100 to store and manage data. The storage system 100 may comprise a computer system that stores data in a set of one or more storage devices 130. A storage device 130 may comprise writable storage device media such as disk devices, video tape, optical devices, DVD, magnetic tape, flash memory, Magnetic Random Access Memory (MRAM), Phase Change RAM (PRAM), or any other similar media adapted to store information (including data and parity information).

As known in the art, a storage device 130 may have one or more storage volumes, where each volume has a file system implemented on the volume. A file system implemented on the storage devices 130 may provide multiple directories in a single volume, each directory containing zero or more filenames. A file system provides a logical representation of how data (files) are organized on a volume where data (files) are represented as filenames that are organized into one or more directories. Examples of common file systems include New Technology File System (NTFS), File Allocation Table (FAT), Hierarchical File System (HFS), Universal Storage Device Format (UDF), UNIX® file system, and the like. For the Data ONTAP® storage operating system (available from NetApp, Inc. of Sunnyvale, Calif.) which may implement a Write Anywhere File Layout (WAFL®) file system, there is typically a WAFL file system within each volume, and within a WAFL file system, there may be one or more logical units (LUs).

A. Multi-Protocol Storage System

FIG. 1B is a schematic block diagram of a multi-protocol storage system 100 configured to provide storage service relating to the organization of information on storage devices, such as disks 130. The storage system 100 is illustratively embodied as a storage system comprising a processor 122, a memory 124, a plurality of network adapters 125, 126 and a storage adapter 128 interconnected by a system bus 123. The multi-protocol storage system 100 also includes a storage operating system 200 that provides a virtualization system (and, in particular, a file system) to logically organize the information as a hierarchical structure of named directory, file and virtual disk (vdisk) storage objects on the disks 130.

Whereas servers of a NAS-based network environment have a storage viewpoint of files, the servers of a SAN-based network environment have a storage viewpoint of blocks or disks. To that end, the multi-protocol storage system 100 presents (exports) disks to SAN servers through the creation of vdisk objects. A vdisk object (hereinafter "vdisk") is a special file type that is implemented by the virtualization system and translated into an emulated disk as viewed by the SAN servers. The multi-protocol storage system thereafter makes these emulated disks accessible to the SAN servers through controlled exports, as described further herein. A vdisk may also be referred to as a logical unit (LU) having an associated logical unit number (LUN) that uniquely identifies the vdisk/LU within a volume of the storage system. In some embodiments, a volume may only contain a limited number of vdisks/LUs up to a maximum number of allowed vdisks/LUs.

In the illustrative embodiment, the memory 124 comprises storage locations that are addressable by the processor and adapters for storing software program code and data structures. The processor and adapters may, in turn, comprise processing elements and/or logic circuitry configured to execute the software code and manipulate the various data structures. The storage operating system 200, portions of which are typically resident in memory 124 and executed by the processing elements, functionally organizes the storage system by, inter alia, invoking storage operations in support of the storage service implemented by the storage system. It will be apparent to those skilled in the art that other processing and memory implementations, including various computer readable media, may be used for storing and executing program instructions pertaining to the inventive system and method described herein.

The network adapter 125 couples the storage system to a plurality of servers 110a,b over point-to-point links, wide area networks, virtual private networks implemented over a public network (Internet) or a shared local area network, hereinafter referred to as an illustrative Ethernet network 167. Therefore, the network adapter 125 may comprise a network interface card (NIC) having the mechanical, electrical and signaling circuitry needed to connect the storage system to a network switch, such as a conventional Ethernet switch 170. For this NAS-based network environment, the servers are configured to access information stored on the multi-protocol storage system as files. The servers 110 communicate with the storage system over network 167 by exchanging discrete frames or packets of data according to pre-defined protocols, such as the Transmission Control Protocol/Internet Protocol (TCP/IP).

The servers 110 may be general-purpose computers configured to execute applications over a variety of operating systems, including the UNIX® and Microsoft Windows® operating systems. Server systems generally utilize file-based access protocols when accessing information (in the form of files and directories) over a NAS-based network. Therefore, each server 110 may request the services of the storage system 100 by issuing file access protocol messages (in the form of packets) to the storage system over the network 167. For example, a server 110a running the Windows operating system may communicate with the storage system 100 using the Common Internet File System (CIFS) protocol. On the other hand, a server 110b running the UNIX operating system may communicate with the multi-protocol storage system using the Network File System (NFS) protocol 164 over TCP/IP 162. It will be apparent to those skilled in the art that other servers running other types of operating systems may also communicate with the integrated multi-protocol storage system using other file access protocols.

The storage network "target" adapter 126 also couples the multi-protocol storage system 100 to servers 110 that may be further configured to access the stored information as blocks or disks. For this SAN-based network environment, the storage system is coupled to an illustrative Fibre Channel (FC) network 185. FC is a networking standard describing a suite of protocols and media that is primarily found in SAN deployments. The network target adapter 126 may comprise a FC host bus adapter (HBA) having the mechanical, electrical and signaling circuitry needed to connect the storage system 100 to a SAN network switch, such as a conventional FC switch 180. In addition to providing FC access, the FC HBA may offload fibre channel network processing operations for the storage system.

The servers 110 generally utilize block-based access protocols, such as the Small Computer Systems Interface (SCSI) protocol, when accessing information (in the form of blocks, disks or vdisks) over a SAN-based network. SCSI is an input/output (I/O) interface with a standard, device independent protocol that allows different peripheral devices, such as disks 130, to attach to the storage system 100. In SCSI terminology, servers 110 operating in a SAN environment are initiators that initiate requests and commands for data. The multi-protocol storage system is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The multi-protocol storage system 100 supports various SCSI-based protocols used in SAN deployments, including SCSI encapsulated over TCP (iSCSI), SCSI encapsulated over FC (FCP), and Fibre Channel Over Ethernet (FCoE). The initiators (hereinafter servers 110) may thus request the services of the target (hereinafter storage system 100) by issuing iSCSI and FCP messages over the network 167, 185 to access information stored on the disks. It will be apparent to those skilled in the art that the servers may also request the services of the integrated multi-protocol storage system using other block access protocols. By supporting a plurality of block access protocols, the multi-protocol storage system provides a unified and coherent access solution to vdisks/LUs in a heterogeneous SAN environment.

The storage adapter 128 cooperates with the storage operating system 200 executing on the storage system to access information requested by the servers. The information may be stored on the disks 130 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 122 (or the adapter 128 itself) prior to being forwarded over the system bus 123 to the network adapters 125, 126, where the information is formatted into packets or messages and returned to the servers.

Storage of information on the storage system 100 is preferably implemented as one or more storage volumes that comprise a cluster of physical storage disks 130, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may be used in accordance with the present invention.

In accordance with an illustrative embodiment of the present invention, a server 110b includes various software layers or modules executing thereon. For example, the server 110b may be executing a Network File System (NFS) layer 164 that implements the NFS protocol and cooperates with a TCP/IP layer 162 to enable the server to access files stored on the storage system using the NFS protocol. The server 110b may also include a Fibre Channel (FC) driver 168 for communicating with the storage system utilizing the Fibre Channel protocol.

A server 110b may also execute, in an illustrative embodiment, a mount daemon 166 which interacts with the storage operating system 200 of the storage system 100 to enable transparent access to blocks, such as vdisks, stored on a storage system using a file-based protocol such as NFS. The mount daemon 166 operates in conjunction with the NFS Proxy layer, described further below, to provide appropriate device addresses to the storage system 100. The mount daemon 166 may be implemented as a background process, thread or may be a remotely callable library of procedures that performs the various functionality described below. A method and apparatus for allowing a server transparent access to blocks, such as vdisks, stored on a storage system using a file-based protocol. The process of allowing a server transparent access to a vdisk using a file-based protocol may sometimes be referred to herein as "transparent access process/technique."

It should be noted that the software layers that are shown for server 110b are exemplary only and that they may be varied without departing from the spirit and scope of the invention. Additionally, it should be noted that the NFS layer 164 is shown for exemplary purposes only. Any file-based protocol may be utilized in accordance with the teachings of the present invention, including, for example CIFS.

B. Storage System Operating System

To facilitate access to the disks 130, the storage operating system 200 implements a write-anywhere file system of a virtualization system that "virtualizes" the storage space provided by disks 130. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN storage system approach to storage by enabling file-based (NAS) access to the named files and directories, while further enabling block-based (SAN) access to the named vdisks on a file system based storage platform. The file system simplifies the complexity of management of the underlying physical storage in SAN deployments.

As noted, a vdisk is a special file type in a volume that derives from a normal (regular) file, but that has associated export controls and operation restrictions that support emulation of a disk. Unlike a file that can be created by a server using, e.g., the NFS or CIFS protocol, a vdisk is created on the multi-protocol storage system via, e.g. a user interface (UI) as a special typed file (object). Illustratively, the vdisk is a multi-inode object comprising a special file inode that holds data and at least one associated stream inode that holds attributes, including security information. The special file inode functions as a main container for storing data, such as application data, associated with the emulated disk. The stream inode stores attributes that allow LUs and exports to persist over, e.g., reboot operations, while also enabling management of the vdisk as a single disk object in relation to NAS servers.

In the illustrative embodiment, the storage operating system 200 may comprise Data ONTAP® storage operating system, available from NetApp, Inc. of Sunnyvale, Calif., which implements a Write Anywhere File Layout (WAFL®) file system. However, it is expressly contemplated that any appropriate storage operating system, including a write in-place file system, may be enhanced for use in accordance with embodiments described herein. As such, where the term "WAFL" is employed, it should be taken broadly to refer to any storage operating system that is otherwise adaptable to the teachings of this embodiment.

As used herein, the term "storage operating system" generally refers to the computer-executable code operable on a computer that manages data access and may, in the case of a multi-protocol storage system, implement data access semantics, such as the Data ONTAP® storage operating system, which is implemented as a microkernel. The storage operating system can also be implemented as an application program operating over a general-purpose operating system, such as UNIX® or Windows®, or as a general-purpose operating system with configurable functionality, which is configured for storage applications as described herein.

In addition, it will be understood to those skilled in the art that the inventive system and method described herein may apply to any type of special-purpose (e.g., storage serving storage system) or general-purpose computer, including a standalone computer or portion thereof, embodied as or including a storage system. Moreover, the teachings of this embodiment can be adapted to a variety of storage system architectures including, but not limited to, a network-attached storage environment, a storage area network and disk assembly directly-attached to a server or host computer. The term "storage system" should therefore be taken broadly to include such arrangements in addition to any subsystems configured to perform a storage function and associated with other equipment or systems.

Figure 2:
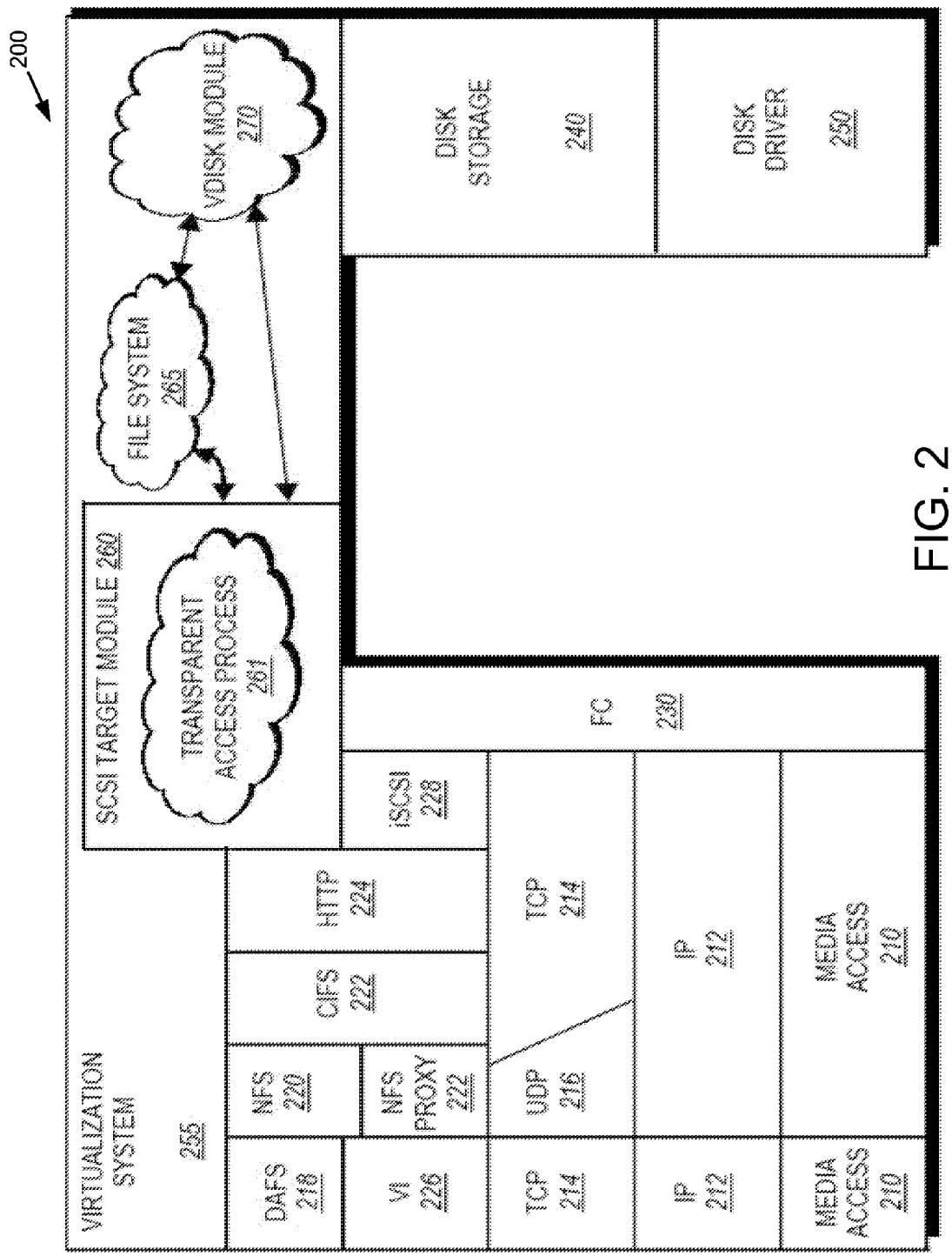
FIG. 2 is a schematic block diagram of an exemplary storage operating system used in some embodiments.

FIG. 2 is a schematic block diagram of an exemplary storage operating system 200 used in some embodiments. The storage operating system comprises a series of software layers organized to form an integrated network protocol stack or, more generally, a multi-protocol engine that provides data paths for servers to access information stored on the multi-protocol storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the DAFS protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as remote direct memory access (RDMA), as required by the DAFS protocol 218.

The file system protocol layer also includes, in the illustrative embodiment a NFS proxy layer 222. In some embodiments, the NFS proxy layer 222 examines each NFS Open or look up commands received from a server to determine if the command is to utilize the transparent access technique. The NFS proxy layer 222 performs this function by examining the filename field of the received Open command, described further below. It should be noted that an NFS proxy layer is shown for exemplary purposes only. The teachings of the present embodiment may be utilized with any file-based protocol including, for example CIFS or HTTP. In such alternate embodiments, an appropriate proxy layer would be implemented within the storage operating system.

An iSCSI driver layer 228 provides block protocol access over the TCP/IP network protocol layers, while a FC driver layer 230 operates with the FC HBA 126 to receive and transmit block access requests and responses to and from the integrated storage system. The FC and iSCSI drivers provide FC-specific and iSCSI-specific access control to the LUs (vdisks) and, thus, manage exports of vdisks to either iSCSI or FCP or, alternatively, to both iSCSI and FCP when accessing a vdisk on the multi-protocol storage system. In addition, the storage operating system includes a disk storage layer 240 that implements a disk storage protocol, such as a RAID protocol, and a device driver layer 250 (e.g., disk driver layer) that implements a device control protocol (such as small computer system interface (SCSI), integrated drive electronics (IDE), etc.).

C. Transparent Access Process Components of Storage Operating System

Bridging the disk software layers with the integrated network protocol stack layers is a virtualization system 255. The virtualization system 255 is implemented, in the illustrative embodiment, by a file system 265 cooperating with virtualization modules illustratively embodied as, e.g., vdisk module 270 and SCSI target module 260. It should be noted that the vdisk module 270, file system 265 and SCSI target module 260 can be implemented in software, hardware, firmware, or a combination thereof.

The vdisk module 270 interacts with the file system 265 to provide a data path from the block-based SCSI target module to blocks managed by the file system. In essence, the vdisk module 270 manages SAN deployments by, among other things, implementing a comprehensive set of vdisk (LU) commands that are converted to primitive file system operations ("primitives") and that interact with the file system 265 and the SCSI target module 260 to implement the vdisks.

The SCSI target module 260, in turn, initiates emulation of a disk or LU by providing a mapping procedure that translates logical block access to LUs specified in access requests into virtual block access to the special vdisk file types and, for responses to the requests, vdisks into LUs. The SCSI target module is illustratively disposed between the iSCSI and FC drivers 228, 230 and the file system 265 to thereby provide a translation layer of the virtualization system 255 between the SAN block (LU) space and the file system space, where LUs are represented as vdisks.

In addition, the SCSI target module 260 includes one or more transparent access processes 261. The transparent access processes 261, described further below, enable servers to transparently access a vdisk by utilizing a file-based protocol. These transparent processes 261 cooperate with the mount daemon 166 executing on the server to implement the novel system and method for transparently accessing vdisks using a file-based protocol.

The file system 265 illustratively implements the WAFL file system having an on-disk format representation that is block-based using, e.g., 4 kilobyte (KB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk.

Broadly stated, all inodes of the file system are organized into the inode file. A file system (FS) info block specifies the layout of information in the file system and includes an inode of a file that includes all other inodes of the file system. Each volume has an FS info block that is preferably stored at a fixed location within, e.g., a RAID group of the file system. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file or vdisk.

D. Transparent Access Process

As described above, the transparent access process/technique may enable a server application to issue a file-based protocol Open command and transparently access a virtual disk stored on a storage system using a block-based protocol. The server may utilize the convenient namespace of the file-based protocol, while obtaining the performance benefits of the high-speed data access path associated with the vdisk. The server may execute a mount daemon 166 that interacts with a NFS proxy layer 222 (or other file-based protocol proxy layer) executing on the storage system 100.

The transparent access is initiated by prepending a predetermined and special prefix to a filename contained in an Open command sent through the file-based protocol. The NFS proxy layer 222, executing within the storage operating system 200 of the storage system, identifies that the Open command is directed to a filename that contains the predetermined prefix and initiates the transparent access process (file to vdisk conversion). The NFS proxy layer 222, in conjunction with the SCSI target module 260 of the storage operating system, ensures that the file requested to be opened is represented as a vdisk which is exported to the requesting server. If the file to be opened is not already a vdisk, the procedure also converts it to one using conventional file to vdisk conversion routines. The storage system 100 then communicates with the mount daemon 166 executing on the server 110. The mount daemon ensures that the exported vdisk is mapped to the server and, if it is not already, causes the server 110 to rescan the SCSI devices connected thereto to identify the newly mounted vdisk. Thus, a server may open a vdisk utilizing a file-based protocol and its associated namespace but perform later data access operations using a block-based protocol data path.

Thus, applications and clients 160/users of servers 110 served by the storage system 100 may utilize the namespace available from the file-based protocol, while benefiting from the high-speed data connection provided by an underlying transport media, such as Fibre Channel, connected to the vdisk. This enables an application executing on a server of the storage system to issue an Open command to access the vdisk using a conventional file-based protocol, such as the NFS protocol. The application may invoke the use of a transparent access process executing on the storage system by prepending a predetermined and special prefix to the filename in the Open command.

A NFS proxy layer 222 of a storage operating system 200 checks the filename sent in the filename field of the Open command. If the filename does not include the special prefix, then the storage operating system processes the request using the conventional file-based protocol. However, if the file name includes the predetermined and special prefix, then the NFS proxy layer 222 maps the vdisk associated with the file to be opened to the server that issued the Open command. A logical unit number (LUN) associated with this vdisk (LU) is also mapped to the server by the NFS proxy layer. The NFS proxy layer also, via a remote procedure call (RPC) or similar application-to-application communication method, communicates with a mount daemon 166 executing on the server.

The mount daemon 166 communicates to the storage system a set of major and minor device numbers to be associated with a newly created character device instance. A character device is a block-level interface that permits an arbitrary number of bytes to be written to a device. Typically, the number of bytes written is a multiple of the size of the data blocks on the storage device. Using the returned major/minor numbers, the NFS proxy layer generates a response to the Open command and returns that response to the server. The server, upon receiving the response, generates a new instance of a character device using the major/minor device numbers. The server then returns a file descriptor to the issuing application.

Thus, to the issuing application, and users thereof, the file has been opened using conventional NFS or other file-based protocol commands and its associated namespace. However, the NFS proxy layer, in conjunction with the mount daemon has generated a new character device on the server that enables the server to read and write raw data over the Fibre Channel or other block-based network infrastructure. Thus, a server experiences the ease of use of the file-based namespace, while benefiting from the performance of the block-based network infrastructure.

II. Method and System for Determining Storage Resources of VMs

A. Virtual Server Environment

Figure 3:
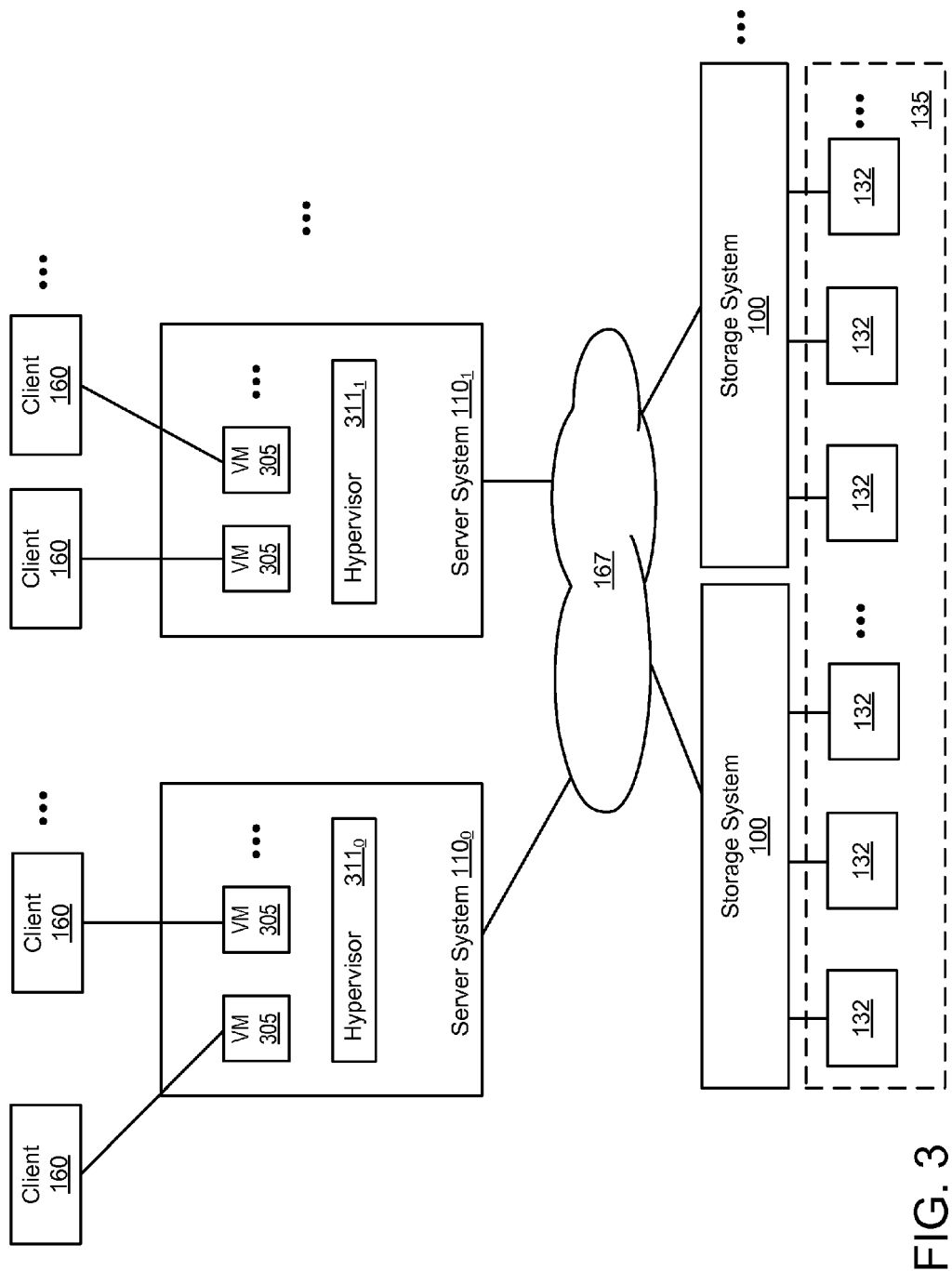
FIG. 3 shows a conceptual diagram of a virtual server environment comprising a plurality of clients and a plurality of physical servers accessing a storage system.

In some embodiments, the storage system 100 is used in a virtual server environment. FIG. 3 shows a conceptual diagram of a virtual server environment comprising a plurality of clients 160 and a plurality of physical servers $110_0$, $110_1$ ... $110_N$ accessing a plurality of storage systems 100. Each storage system 100 may comprise a set of storage resources 132 for storing client data, the storage resources 132 comprising a shared storage 135 of the storage systems 100. For illustrative purposes, in some embodiments below, a storage resource 132 comprises a logical unit (LU) that comprises one or more storage devices 130, or portions of one or more storage devices 130 (e.g., where a single LU may be striped across several storage devices 130. In other embodiments, however, the storage resource 132 may comprise another type of storage element, such as a volume or a storage device.

Each server 110 may include one or more virtual machines 305 (VMs) that reside and execute on the server 110. Each VM 305 may comprise a separate encapsulation or instance of a separate operating system and one or more applications that execute on the server. As such, each VM 305 on a server 110 may have its own operating system and set of applications and function as a self-contained package on the server and multiple operating systems may execute simultaneously on the server.

Each VM 305 on a server 110 may be configured to share the hardware resources of the server. Each server may also include a VM monitor module/engine 311 (sometimes referred to as a hypervisor module/engine 311) that executes on the server to produce and manage the VMs. The VM monitor module/engine 311 (hypervisor 311) may also virtualize the hardware and/or software resources (including virtual storage components) of the servers for use by the VMs 305. The operating system of each VM may utilize and communicate with the resources of the server via the VM monitor/hypervisor engine. For illustrative purposes, in the description below, the VM monitor module/engine comprises a hypervisor module/engine 311 (e.g., $311_0$, $311_1$, $311_2$). In other embodiments, however, a different type of VM monitor module/engine may be used other than the hypervisor module/engine.

The virtual server environment may also include a plurality of clients 160 connected with each server 110 for accessing client data stored on the storage system 100. Each client 160 may connect and interface/interact with a particular VM 305 of a server 110 to access client data of the storage system. From the viewpoint of a client 160, the VM 305 may comprise a virtual server that appears and behaves as an actual physical server or behaves as an actual desktop machine.

A storage system 100 may be configured to allow servers 110 to access its data, for example, to read or write data to the storage system. A server 110 may execute an application that "connects" to the storage system over a computer network 167 to send an access request (read or write request) to the storage system for accessing particular data stored on the storage system. Each server 110 may also include multiple VMs, each VM 305 being used by and connected with a client 160 through a computer network. Each VM 305 may also execute an application for sending read/write requests (received from the connected client 160) for accessing data on the storage system. The VM applications executing on the server may service the connected clients 160 by receiving the client access requests and submitting the access requests to the storage system 100 for execution.

B. Server Components

Figure 4:
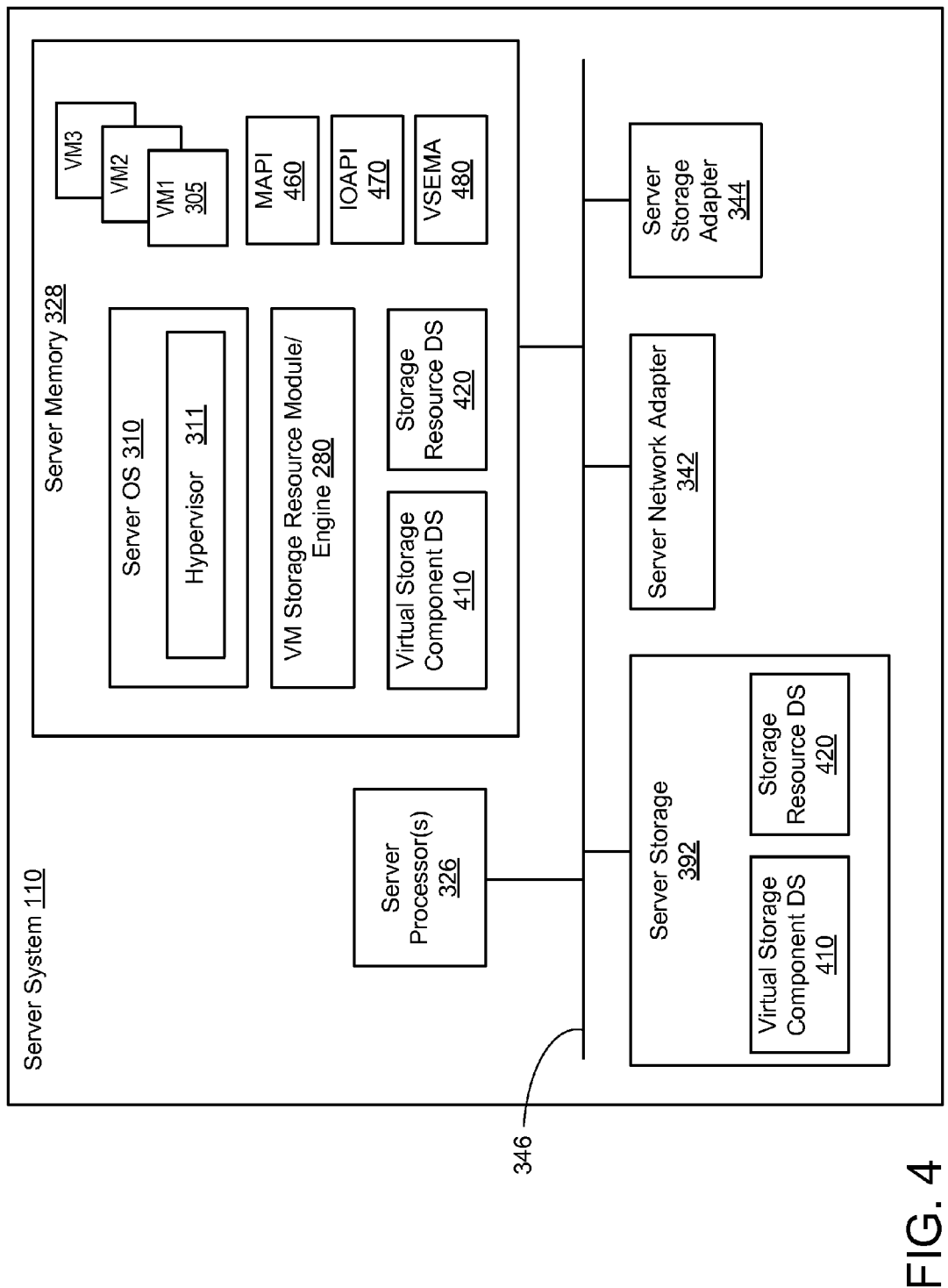
FIG. 4 is a diagram illustrating components of a server system within a virtual server environment.

FIG. 4 is a diagram illustrating components of a server system 110 within a virtual server environment. As shown in FIG. 3, a server system 110 may comprise one or more server processor(s) 326, server memory 328, one or more server network adapters 342, one or more server storage adapters 344, server storage 392, and other devices or peripherals (not shown) coupled to the processor by a bus 346.

The server processors are the central processing units (CPUs) of the server system 110 and, thus, control the overall operation of the server system 110. Server processors may include one or more programmable general-purpose or special-purpose microprocessors, digital signal processors (DSPs), programmable controllers, application specific integrated circuits (ASICs), programmable logic devices (PLDs), or the like, or a combination of such devices.

A server network adapter 342 may comprise mechanical, electrical, and signaling circuitry needed to connect the server system 110 to the network and to receive and transmit data over the network. The server network adapter 342 may comprise a network port controller (e.g., Ethernet cards), specialized network adapters, or any other physical device that controls the receiving and transmitting of data over a network. A server network adapter 342 may provide one or more network ports (i.e., data-access ports) for coupling the server system 110 to one or more other client systems 160 through a network 165. A connection with a client system 160 may be established using a network port of the server network adapter 342 to receive and transmit data though the network 165.

Server memory 328 comprises storage locations that are addressable by the processor and adapters (e.g., a server network), as well as other devices for storing software program code such as the software described herein. The server processor and server adapters may, in turn, comprise processing elements and/or logic circuitry configured to execute the software code. Server memory 328 can be a random access memory (RAM), a read-only memory (ROM), or the like, or a combination of such devices. It will be apparent to those skilled in the art that other processing and memory means, including various computer readable media, may be used for storing and executing program instructions pertaining to the invention described herein.

Server memory 328 is for storing software program instructions and data structures such as a server operating system 310 (having a hypervisor module 311), a VM storage resource module/engine 280, one or more virtual machines 305, a virtual storage component data structure 410, a storage resource data structure 420, a management application programming interface (MAPI) 460, an input/output application programming interface (IOAPI) 470, and a virtual server environment monitoring application (VSEMA) 480. A server system 110 loads information, instructions, par, and data structures into server memory 328 from which they are accessed and executed or processed by server processors 326 via a bus 346.

The server operating system 310 and hypervisor 311 may be, for example, VMware™ ESX, Microsoft™ Hyper-V, Microsoft™ Virtual Server, NetApp SnapShot™, NetApp SnapMirror™, Citrix XenServer™, UNIX®, Windows NT®, Linux®, or any other operating system and hypervisor capable of producing and configuring one or more virtual machines. The server operating system 310 may further include components discussed above in relation to FIG. 1B, such as mount daemon 166, Fibre Channel (FC) driver 168, TCP/IP 162, Network File System (NFS) layer 164 (not shown).

Server storage 392 may comprise a local writable storage device, such as disk devices, video tape, optical devices, DVD, magnetic tape, flash memory, Magnetic Random Access Memory (MRAM), Phase Change RAM (PRAM), or any other similar media adapted to store information (including data and parity information). As shown in the example of FIG. 4, server storage 392 may store VM data, the virtual storage component data structure 410, and the storage resource data structure 420.

A VM 305 may be represented by data that describes the VM (referred to herein as "VM data"). In the example shown in FIG. 4, the server storage 392 may store VM data for one or more VMs 305. In other embodiments, however, the VM data may be stored elsewhere (e.g., on the storage system). VM data may be stored and used later for producing and deploying the VM 305 represented by the VM data on a server 110. In some embodiments, VM data for a VM specifies hardware and/or software resources on a server and/or storage system that the VM uses during operation. As such, a VM may be viewed as being composed of the specified hardware and/or software resources.

The VM data for a VM may comprise a set of one or more VM files that describes hardware and/or software resources (including virtual storage components) used by the VM. For example, the set of VM files may comprise a VM configuration file specifying various components that the VM uses, such as an operating system, network adaptor, IP address, hard disks, etc. The set of VM files may also comprise one or more virtual hard disk (VHD) files specifying virtual hard disks that the VM uses (e.g., C, E, F drives). The set of VM files may further comprise one or more PTD files specifying PTDs that the VM uses.

In some embodiments, a VM storage resource module/engine 280 may reside and execute on the server 110 for performing embodiments described herein for determining storage resources of VMs. The VM storage resource module/engine 280 may be configured to do so automatically, without human initiation, interaction, or intervention. In some embodiments, the VM storage resource module/engine 280 may comprise a software module or engine that resides and executes on a server 110 hosting VMs 305. In other embodiments, the VM storage resource module/engine 280 may reside on a server 110 that does not host VMs 305 and is dedicated for executing the VM storage resource module/engine 280. In further embodiments, the VM storage resource module/engine 280 may be executed by a VM 305 dedicated for executing the VM storage resource module/engine 280.

The VM storage resource module/engine 280 may be configured to operate in conjunction with other software modules of the server system 110 and software modules of the storage system 100 to collectively perform the embodiments described herein. For example, the VM storage resource module 280 may use functions of a management application programming interface (MAPI) 460 to perform some embodiments described herein. The management application programming interface may be configured for managing and configuring hardware and software components on the server (such as system and network devices). An example of a management application programming interface is the Windows Management Instrumentation® (WMI) program that is typically included in current Windows® operating systems.

The VM storage resource module 280 may also use functions of an input/output application programming interface (IOAPI) 470 to perform some embodiments described herein. The input/output application programming interface may be configured for sending low-level commands to hardware devices (such as storage devices), the commands being at a level lower than a file system read/write command. An example of a management application programming interface is the Windows IOCTL (DeviceIoControl) API program The VM storage resource module 280 may further use functions of a virtual server environment monitoring application (VSEMA) 480 to perform some embodiments described herein. The VSEMA 480 may be configured for monitoring objects comprising hardware and/or software components throughout a virtual server environment, including VMs 305 and storage resources 132. Objects for monitoring may be added to a database of the VSEMA 480 to initiate monitoring of the objects. In some embodiments, the VM storage resource module 280 may add at least one VM and its corresponding storage resources 132 to the database as objects for monitoring. An example of the VSEMA 480 is the Microsoft System Center Operations Manager® (SCOM) application for monitoring storage system environments.

C. Virtual Storage Components and Storage Resources

Figure 5:
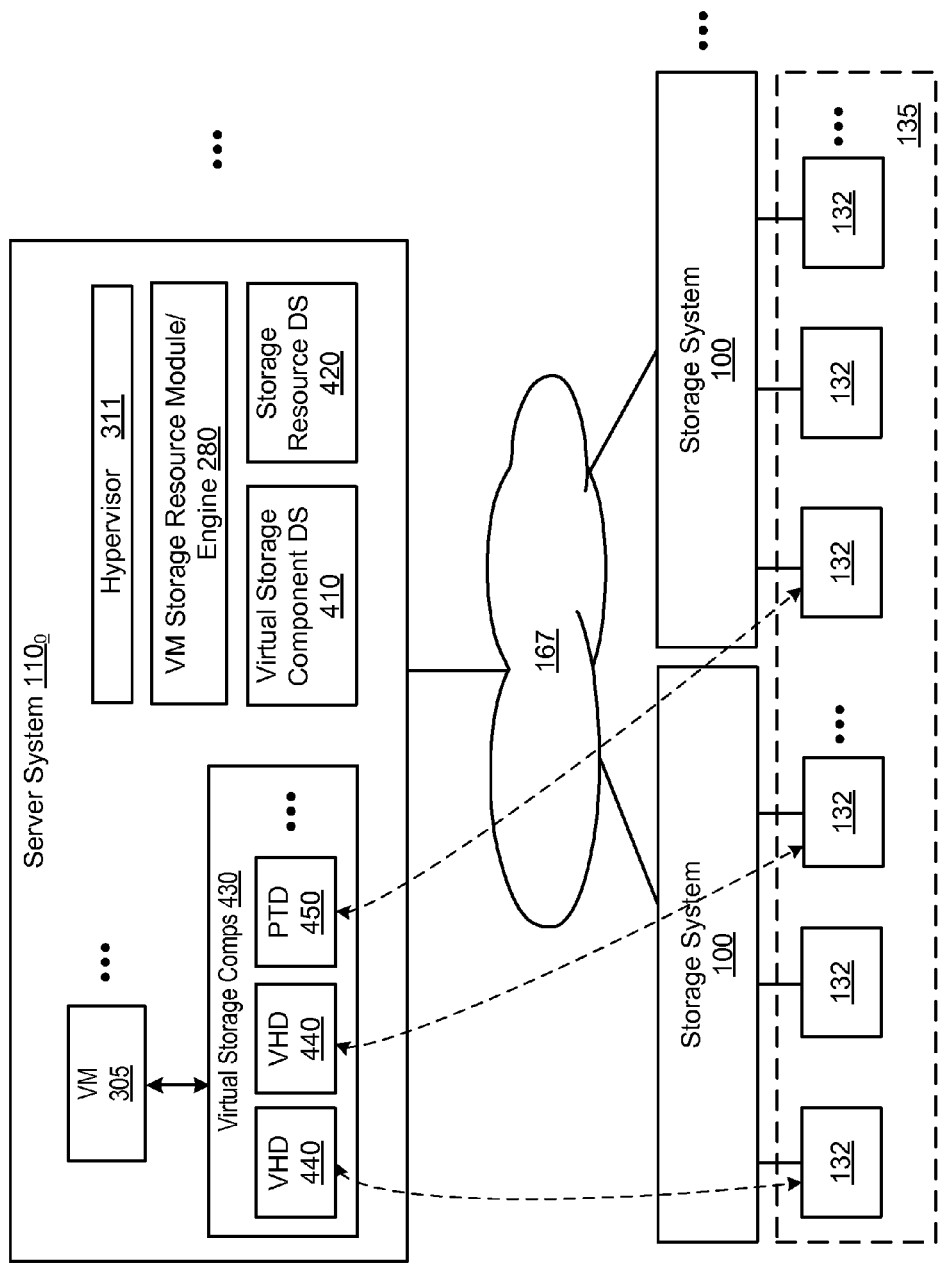
FIG. 5 shows a conceptual diagram of a virtual server environment having virtual storage components and underlying storage resources.

FIG. 5 shows a conceptual diagram of a virtual server environment having virtual storage components and underlying storage resources. As discussed above, the VM monitor module 311 of a server 110 may virtualize the hardware and/or software resources for use by the VMs 305 of the server 110. For each server these resources may include storage resources 132 (e.g., logical units) distributed on the one or more storage systems 100. Each storage system 100 may allocate its storage resources 132 to one or more physical servers 110, each allocated storage resource being "mounted" (i.e., made available) to a particular physical server 110. For example, a storage system may allocate one or more logical units (LUs) to a physical server, each LU being mounted and made available to the physical server. As such, each physical server 110 may have one or more LUs available for use from one or more storage systems. A mounted storage resource 132 may appear to the server 110 as a direct-attached physical storage device, such as a direct-attached Small Computer System Interface (SCSI) or Serial ATA (SATA) disk device.

Some or all storage resources 132 (e.g., LUs) that are made available to a physical server may be virtualized by the hypervisor 311 for use by the VMs. The VM monitor module 311 may virtualize the storage resources 132 by producing virtual storage components 430 for use by the VMs 305 and virtual storage information that describes these virtual storage components 430. For each VM, the VM monitor module may allocate one or more virtual storage components 430 for use by the VM. The virtual storage information may be used by a VM to locate and access its virtual storage component(s).

For example, virtual storage components 430 may include virtual hard disks (VHDs) 440 or pass-through disks (PTDs) 450. As known in the art, for a VHD 440, the server 110 may format an underlying storage resource 132 with a file system, create a VHD file, and expose the VHD file to the VM 305 as a virtual hard disk. As used herein, the terms VHD and VHD file may sometimes be used interchangeably. The server 110 may place other files on the underlying storage resource 132 that are not stored on the storage resource 132 by the VM 305 (and of which the VM 305 has no knowledge). A PTD may provide a different means by which a VM 305 may access a storage resource 132. As known in the art, for a PTD 450, the server 110 may not format the underlying storage resource 132 with a file system and makes the entire storage resource 132 available to the VM 305 as a raw block storage device.

To a VM 305, each virtual storage component 430 may appear as a directly attached physical storage device (e.g., a drive or disk) that is directly accessed by the VM. But in fact, each virtual storage component 430 (e.g., VHD 440 or PTD 450) hosted on a server 110 is supported by an underlying corresponding storage resource 132 residing somewhere on one of the storage systems 100 (as indicated by the dashed lines in FIG. 5).

D. Method for Determining Storage Resources of a VM

The VM storage resource module 280 may be configured to determine the underlying corresponding storage resources 132 for each VM 305 of each server 110 of a virtual server environment. In some embodiments, the VM storage resource module 280 may determine storage resources of each VM 305 on a server 110 in a three-phase process. As discussed above, the VM monitor module (hypervisor) 311 may virtualize the storage resources by producing virtual storage components 430 (e.g., VHDs, PTDs, etc.) for use by the VMs and virtual storage information that describes these virtual storage components. In a first phase, the VM storage resource module 280 may determine, for each VM on a server, all virtual storage components allocated to the VM and virtual storage information that describes each allocated virtual storage component. For each virtual storage component, the virtual storage information may include a "connecting storage information" that is used to later correlate the virtual storage component with a storage resource on a storage system. In a second phase, the VM storage resource module 280 may determine, for each storage resource available to a server, connecting storage information associated with the storage resource as well as storage resource information describing the storage resource. In a third phase, using the connecting storage information, the VM storage resource module 280 may determine, for each virtual storage component used by a VM, a corresponding storage resource on a storage system that underlies the virtual storage component.

Figure 6:
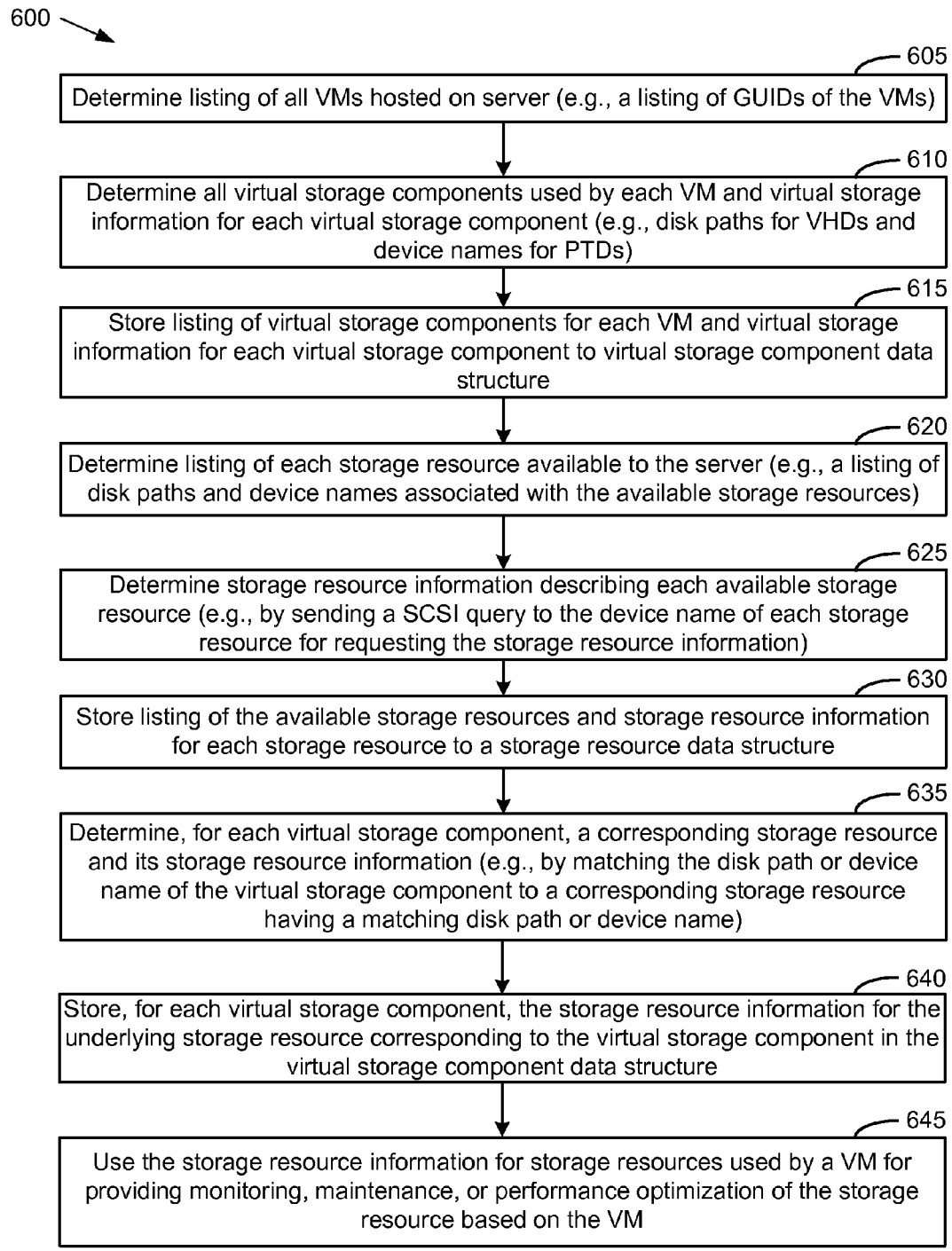
FIG. 6 is a flowchart of a method for determining storage resources on a storage system of each VM on a server.

FIG. 6 is a flowchart of a method 600 for determining storage resources on a storage system of each VM on a server, in accordance with some embodiments. The method 600 of FIG. 6 is described in relation to FIGS. 5 and 7-9 which conceptually illustrate steps of the staging method 600. In some embodiments, the method 600 may determine storage resources of each VM automatically, without human initiation, interaction, or intervention. The order and number of steps of the method 600 are for illustrative purposes only and, in other embodiments, a different order and/or number of steps are used. For illustrative purposes, the storage resource is described below as a logical unit (LU). In other embodiments, however, the storage resource may comprise another type of storage resource.

In some embodiments, some of the steps of the method 600 are performed or caused to be performed by a VM storage resource module/engine 280 executing on a server 110. The VM storage resource module/engine 280 may be configured to operate in conjunction with other software modules of the server system 110 and software modules of the storage system 100 to collectively perform the method 600. The VM storage resource module/engine 280 may perform the method 600 by sending requests/commands to the various software modules of the server system 110 and the storage systems 100 to perform specified operations. The various software modules of the server system 110 and the storage systems 100 may receive and execute/perform such commands to collectively perform the method 600. For example, the VM storage resource module 280 may use functions of the MAPI 460, IOAPI 470, and/or VSEMA 480 to perform the method 600.

In some embodiments, the method 600 comprises a three phase process. The first phase may comprise steps 605-615, the second phase may comprise steps 620-630, and the third phase may comprise steps 635-640 of the method 600. In some embodiments, the method 600 is performed repeated on each server system 110 in the virtual server environment that is executing the VM storage resource module 280 and the VM monitor module/engine 311 (hypervisor engine).

The method 600 begins by determining (at 605) a listing of all VMs hosted and executing on the server. In some embodiments, the listing of VMs may comprise a listing of unique identifiers of the VMs. For example, when the VMs are produced by the hypervisor 311, the hypervisor 311 may produce and assign a Globally Unique IDentifier (GUID) to each VM, the listing of VMs comprising a listing of GUIDs. For example, the method may determine (at 605) the listing of all VMs using a management application programming interface (MAPI) 460 (such as Windows Management Instrumentation® (WMI)). For example, to request the VM listing, the method 600 may connect to the "\root\virtualization WMI namespace" and invoke "SELECT * FROM Msvm_ComputerSystem," whereby the response for this command lists the GUIDs of all VMs hosted and executing on the server. In other embodiments, the method may use other methods known in the art to determine the list of hosted VMs.

For each discovered and listed VM, the method 600 then determines (at 610) all virtual storage components used by the VM and virtual storage information that describes each virtual storage component. The virtual storage information for a virtual storage component may comprise various information used by the VM to identify and locate the virtual storage component.

For example, for a virtual storage component comprising a PTD, the virtual storage information may comprise an operating system storage device identifier. In the embodiments described below, for illustrative purposes, the operating system storage device identifier may be referred to as a "device name/handle." In other embodiments, the storage device identifier may comprise a different type of storage device identifier. As known in the art, a device name/handle may comprise an address location of the PTD from the viewpoint of the operating system's input/output (I/O) interface layer, the address location needed for sending a low-level device-access command/query (e.g., SCSI command) to the PTD.

For example, for a virtual storage component comprising a VHD, the virtual storage information may comprise the operating system device path. In the embodiments described below, for illustrative purposes, the operating system device path may be referred to as a "disk path." In other embodiments, the device path may comprise a different type of device path. As known in the art, a disk path may comprise a location of a file (e.g., VHD file) or directory within a formatted disk file system and comprise an address of the file or directory from the viewpoint of the file system. A disk path may have multiple components, including some or all of: drive letter or identifier (identifying a disk), one or more directory names, and a filename of the VHD file.

For each virtual storage component, the virtual storage information may include a "connecting storage information." For example, for a VHD the connecting storage information may comprise the operating system disk path, and for a PTD the connecting storage information may comprise the operating system device name/handle. The connecting storage information may be used to connect/correlate the virtual storage information discovered in the first phase with the storage resource information discovered in the second phase.

For example, the method may determine (at 610) virtual storage components used by each VM and virtual storage information for each virtual storage component by using a management application programming interface (MAPI) 460 (such as Windows Management Instrumentation® (WMI)). For example, for each VM, the method 600 may query MAPI 460 to return related "Msvm_VirtualSystemSettingData objects" comprising VM settings objects. For each returned VM settings object, the method 600 may then query MAPI 460 to return related "Msvm_ResourceAllocationSettingData objects," which comprise VHDs and/or PTDs that were allocated for use by the VM. For each returned VHD, the "Msvm_ResourceAllocationSettingData object" returned from MAPI 460 typically contains a "Connection" field specifying an operating system disk path (e.g. G:\Vms\data.vhd). The operating system disk path may comprise the connecting storage information for the VHD. For each returned PTD, the "Msvm_ResourceAllocationSettingData object" returned from MAPI 460 typically contains a "HostResource" field that typically contains a reference to another object of type "Msvm_DiskDrive," which typically contains a 'ElementName' field that specifies an operating system device name/handle (e.g., "Disk 1" or "\\.\PHYSICALDRIVE1"). The operating system device name/handle may comprise the connecting storage information for the PTD. In other embodiments, the method may use other methods known in the art to determine virtual storage components and virtual storage information of each VM.

The method 600 then stores (at 615) the listing of all VMs, the virtual storage components used by each VM, and the virtual storage information (including connecting storage information) for each virtual storage component to the virtual storage component data structure 410. FIG. 7 shows an exemplary virtual storage component data structure 410 used in some embodiments. In some embodiments, the virtual storage component data structure 410 comprises a plurality of virtual storage component entries 701, each entry 701 representing a virtual storage component of a VM. Each entry 701 may comprise a plurality of data fields for storing data describing the virtual storage component.

In some embodiments, a virtual storage component entry 701 representing a virtual storage component may contain data fields for a VM identifier 705, a virtual storage component type 710, an operating system device name/handle or operating system disk path 715, and corresponding storage resource information 720. The VM identifier 705 may comprise, for example, the GUID of the VM that uses the virtual storage component. The virtual storage component type 710 may comprise, for example, a VHD or PTD type virtual storage component. The device name/handle 715 may be specified for a PTD type virtual storage component (e.g., DN1, DN2, etc.). The disk path 715 may be specified for a VHD type virtual storage component (e.g., DP1, DP2, etc.). The field 715 may comprise the connecting storage information for the virtual storage component. The storage resource information 720 may comprise information regarding the storage resource that underlies and corresponds to the virtual storage component.

The method 600 may store data for the fields 705, 710, and 715 for each entry 701 at step 615. The method 600 may store data for the storage resource information field 720 at the third phase of the method 600 (discussed below). As such, the method 600 produces and stores connecting storage information for each virtual storage component of each VM on the server. Note that each VM may use one or more virtual storage components that are represented by one or more virtual storage component entries 701 in the virtual storage component data structure 410. As such, each VM may be represented by a set of one or more virtual storage component entries 701 in the virtual storage component data structure 410.

In the second phase, the method 600 determines (at 620) a listing of each storage resource (e.g., LU) available to the server. The listing may comprise a listing of connecting storage information (e.g., the disk path and device name/handle) associated with the available storage resources. For example, each storage resource may have an associated device name and disk path, whereby the listing of available storage resources may comprise a listing of the device names and disk paths associated with all the available storage resources of the server.

For example, the method may determine (at 620) the listing of all available storage resources using a MAPI 460 (such as WMI). For example, to request the storage resource listing, the method 600 may connect to the "\root\cimv2 WMI namespace" and invoke "Select * from Win32_DiskDrive where Caption '%NETAPP%'". In response to this command the MAPI may return data regarding all discovered available storage resources, such data comprising, for example, one or more instances of data structure types "Win32_DiskDrive" and "Win32_Volume" for each discovered storage resource. The "Win32_DiskDrive" data structure typically contains a data field "DeviceID" that contains an operating system device name/handle associated the available storage resource. The "Win32_Volume" data structure typically specifies an operating system disk path associated with the available storage resource. The device name/handle and the disk path may comprise connecting storage information associated with an available storage resource. In other embodiments, the method may use other methods known in the art to determine the list of storage resources and connecting storage information associated with each storage resource.

The method 600 then determines (at 625) storage resource information describing each discovered available storage resource. The storage resource information of a storage resource may comprise various information used to identify and locate a storage resource on a storage system. For example, storage resource information for a particular storage resource hosted on a particular storage system may include a name/identifier and network address (IP address) of the storage system, the name/identifier of the volume containing the storage resource, the name/identifier (e.g., LUN or serial number) of the storage resource, the operating system path of the storage resource (e.g., LU path), etc. The name/identifier and network address (IP address) of the storage system may uniquely identify the storage system from the other storage systems in the virtual server environment. The name/identifier of the storage resource may be assigned by the hosting storage system to uniquely identify the storage resource among the other storage resources hosted on the storage system.

The method 600 may determine (at 625) storage resource information using the device names/handles associated with the available storage resources. As discussed above, each storage resource made available (mounted) on a server may appear to the server as a direct-attached physical storage device, such as a direct-attached SCSI or SATA disk device. In some embodiments, the storage resource information for a storage resource is determined by sending a low-level device-access command/query (referred to as a "storage information" command/query) to the storage resource, the storage information command/query specifying the device name of the storage resource and requesting particular storage resource information. In some embodiments, the storage information command does not comprise a file system command (e.g., read/write command) and comprises a device command at a lower level than the file system. In these embodiments, the storage information command is not executed by an operating system's file system and/or volume layers and is executed by an underlying device driver layer (e.g., disk driver layer) that implements a device control protocol (such as small computer system interface (SCSI), integrated drive electronics (IDE), etc.).

For example, the storage information command may comprise a disk-access command/query sent to the device name of the storage resource. In some embodiments, the storage information command/query comprises a SCSI command/query sent to the device name of the storage resource. By specifying the device name of the storage resource, the storage information command/query will be sent to the appropriate storage resource on the appropriate storage system which then receives and processes the storage information command/query to return the requested storage resource information. The method 600 then receiving the requested storage resource information from the appropriate storage resource.

For example, the method 600 may perform step 625 by using an input/output application programming interface (IOAPI) 470 (e.g., Windows IOCTL API). For example, to request storage resource information for a particular storage resource, the method 600 may send a command through the IOAPI 470, the command specifying a device name/handle associated with the particular storage resource and a request for particular storage resource information (e.g., name and network address of the storage system, name of the volume, the name of the storage resource, etc.). The specified device name/handle may be used to locate the appropriate storage resource to send the command. The command will be received by the appropriate storage resource on the appropriate storage system and processed by the appropriate storage resource, which then returns the requested storage resource information.

The method 600 then stores (at 630) the listing of the available storage resources (comprising a listing of connecting storage information associated with the available storage resources) and storage resource information for each storage resource to a storage resource data structure 420. FIG. 8 shows an exemplary storage resource data structure 420 used in some embodiments. In some embodiments, the storage resource data structure 420 comprises a plurality of storage resource entries 801, each entry 801 representing a storage resource mounted and available on the server. Each entry 801 may comprise a plurality of data fields for storing data describing the storage resource.

In some embodiments, a storage resource entry 801 representing a storage resource may contain data fields for an operating system device name/handle 810 associated with the storage resource (e.g., DNX, DNY, etc.), operating system disk path 815 associated with the storage resource (e.g., DPX, DPY, etc.), and storage resource information 820 describing the storage resource (e.g., storage system name and network address, volume name, storage resource name, etc.). The method 600 may store data for the fields 810, 815, and 820 for each entry 801 at step 630. The fields 810 and 815 may comprise connecting storage information for the storage resource. As such, the method 600 produces and stores connecting storage information 810 and 815 and storage resource information 820 for each available storage resource on the server.

Note that the virtual storage information (determined in the first phase) may be used by a VM to locate and access a virtual storage component and can not use or understand storage resource information to directly access the storage resources. Virtual storage information of a virtual storage component typically does not specify which storage resource on a storage system corresponds to the virtual storage component. The storage system typically can not understand or use virtual storage information to locate the corresponding underlying storage resource. In contrast, the storage resource information of a storage resource may be used to identify and locate the storage resource on a particular storage system. However, it may be unclear which storage resource corresponds to which virtual storage component of which VM.

In the third phase, the method 600 determines (at 635), for each virtual storage component used by a VM, a corresponding storage resource on a storage system that underlies the virtual storage component and storage resource information for the underlying storage resources (e.g., name and network address of the storage system, name of the volume, the name of the storage resource, etc.). As such, the method 600 may determine, for each VM, one or more storage resources residing on one or more storage systems that are allocated for and used by the VM, as well as storage resource information for each such storage system. The storage resource information for each underlying storage resource may be determined by retrieving the storage resource information from the storage resource data structure 420.

For each virtual storage component, the method 600 may do so by determining a connecting storage information associated with a particular storage resource (specified in the storage resource data structure 420) that matches the connecting storage information of the virtual storage component (specified in the virtual storage component data structure 410). The storage resource having the matching connecting storage information may comprise the underlying storage resource that corresponds to the virtual storage component. For example, for a virtual storage component comprising a VHD having an operating system disk path, the method 600 may determine/identify a storage resource having a matching associated operating system disk path, the storage resource thus corresponding to the virtual storage component. For example, for a virtual storage component comprising a PTD having an operating system device name/handle, the method 600 may determine/identify a storage resource having a matching associated operating system device name/handle, the storage resource thus corresponding to the virtual storage component.

The method 600 then stores (at 640), for each virtual storage component, the storage resource information for the underlying storage resource corresponding to the virtual storage component in the virtual storage component data structure 410. FIG. 9 shows an exemplary virtual storage component data structure 410 having storage resource information.

As shown in the example, of FIG. 9, the method 600 may store storage resource information for an underlying storage resource corresponding to a virtual storage component in a storage resource information field 720 of the entry 701 that represents the virtual storage component. As such, in the third phase, the method 600 may determine and store storage resource information for each storage resource used by a VM.

After the third phase, the method 600 then uses (at 645) the storage resource information for each storage resource used by each VM, for providing monitoring, maintenance, or performance optimization of the storage resource. In some embodiments, for at least one VM, the method 600 may use the storage resource information of the VM for providing monitoring, maintenance, or performance optimization for the storage resources used by the at least one VM. As discussed above, the storage resources may be located and accessed on the appropriate storage system using the storage resource information for providing such monitoring, maintenance, or performance services. The method 600 then ends.

For example, it may be desirable (at step 645) to monitor storage resources used by a particular VM to determine if there are errors incurred in the storage resources or storage space needs to be increased in the storage resources. Monitoring all storage resources of all the storage systems in general may not be helpful in this regard as storage resources of a particular VM are of interest. As such, the use of the method 600 may be advantageous as it may be used to provide monitoring, maintenance, or optimizing of storage resources based on the particular VM. In some embodiments, the method may provide the services (at step 645) using a virtual server environment monitoring application (VSEMA) 480 (e.g., Microsoft System Center Operations Manager® (SCOM)). Objects (such as VMs and storage resources) for monitoring may be added to a database of the VSEMA 480 to initiate monitoring of the objects. In some embodiments, the VM storage resource module 280 may add at least one VM and its corresponding storage resources to the database as objects for monitoring.

E. Various Embodiments

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The algorithm, techniques, processes, or methods described in connection with embodiments disclosed herein may be embodied directly in hardware, in software executed by a processor, or in a combination of the two. In some embodiments, any software application, program, tool, module, or layer described herein may comprise an engine comprising hardware and/or software configured to perform embodiments described herein. In general, functions of a software application, program, tool, module, or layer described herein may be embodied directly in hardware, or embodied as software executed by a processor, or embodied as a combination of the two. A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

I claim:

1. A system comprising:
   at least one processor;
   memory operatively coupled to the at least one processor, the memory comprising a VM storage resource engine for execution by the at least one processor, the VM storage resource engine to
   determine at least one virtual storage component allocated to a first virtual machine (VM) identified by a first VM identifier, wherein the VM is hosted on a server, each virtual storage component is associated with virtual storage information comprising a device path or a device identifier, and the virtual storage information is produced by the server for accessing, by the first VM, the at least one virtual storage component;
   determine at least one storage resource hosted by at least one storage system and is available to the server, each storage resource is associated with an available device identifier and an available device path;
   determine storage resource information for the at least one storage resource based at least partially on the available device identifier by at least sending a device-access query to the at least one storage resource identified by the available device identifier, the storage resource information for the at least one storage resource comprising information for locating the at least one storage resource on the at least one storage system; and
   store the storage resource information for the at least one storage resource in at least one virtual storage component entry of a virtual storage component data structure, after determining that the available device identifier or the available device path for the at least one storage resource matches the virtual storage information for the at least one virtual storage component, the at least one virtual storage component entry comprising the first VM identifier, the virtual storage information, and the storage resource information.

2. The system of claim 1, wherein the device-access query comprises a Small Computer Systems Interface (SCSI) query that specifies the available device identifier, and the storage resource information is received from at least one storage resource identified by the available device identifier.

3. The system of claim 1, wherein the storage resource information for the at least one storage resource is used for locating the at least one storage resource for providing monitoring, maintenance, or performance optimization for the first storage resource.

4. The system of claim 1, wherein the VM storage resource engine is to:
store the virtual storage information for each virtual storage component allocated to the first VM to the virtual storage component data structure, the virtual storage component data structure comprising a plurality of virtual storage component entries, each virtual storage component entry representing a virtual storage component allocated to a VM; and
store, in each virtual storage component entry representing a virtual storage component, the storage resource information for the storage resource corresponding to the virtual storage component.

5. The system of claim 1, wherein:
a virtual storage component comprises a virtual hard disk (VHD) or pass-through disk (PTD) allocated to a VM;
a VHD has a device path used by at least one VM to access the VHD, the device path to represent the virtual storage information for the VHD;
a PTD has a device identifier used by the at least one VM to access the PTD, the device identifier to represent the virtual storage information for the PTD;
for each VHD of the at least one VM, the device path of the VHD is used to determine a corresponding storage resource having a matching device path; and
for each PTD of the at least one VM, the device identifier of the PTD is used to determine a corresponding storage resource having a matching device identifier.

6. The system of claim 1, wherein:
the at least one storage system is coupled to the server through a network; and
the storage resource information for the at least one storage resource further comprises a network address of the at least one storage system and an operating system path of the at least one storage resource.

7. The system of claim 1, wherein the at least one virtual storage component comprises a storage resource underlying the at least one virtual storage component that stores data for the virtual storage component on the at least one storage system.

8. The system of claim 1, wherein the VM storage resource engine is to further monitor at least one storage resource associated with a particular VM based at least partially on storage resource information for the particular VM stored in the virtual storage component data structure.

9. A non-transitory computer readable medium having instructions stored that, when executed, cause a system to:
determine at least one virtual storage component allocated to a first virtual machine (VM) hosted on the server, each virtual storage component is associated with virtual storage information, the first virtual storage information comprising a device path or a device identifier, the virtual storage information is produced by the server for accessing, by the first VM, the at least one virtual storage component;
determine at least one storage resource hosted by at least one storage system and is available to the server, each storage resource is associated with an available device identifier and an available device path;
determine storage resource information for the at least one storage resource based at least partially on the available device identifier by at least sending a device-access query to the at least one storage resource device identified by the available device identifier, the storage resource information for the at least one storage resource comprising information for locating the at least one storage resource on the at least one storage system; and
store the storage resource information for the at least one storage resource in at least one virtual storage component entry of a virtual storage component data structure, after determining that the available device identifier or the available device path for the at least one storage resource matches the virtual storage information for the at least one virtual storage component, the at least one virtual storage component entry comprising the first VM identifier, the virtual storage information, and the storage resource information.

10. The non-transitory computer readable medium of claim 9, wherein the device-access query comprises a Small Computer Systems Interface (SCSI) query.

11. The non-transitory computer readable medium of claim 9, wherein the storage resource information for the at least one storage resource is used for locating the at least one storage resource for providing monitoring, maintenance, or performance optimization for the first storage resource.

12. The non-transitory computer readable medium of claim 9, wherein the instructions, when executed, further cause the system to:
store the virtual storage information for each virtual storage component allocated to the first VM to the virtual storage component data structure, the virtual storage component data structure comprising a plurality of virtual storage component entries, each virtual storage component entry representing a virtual storage component allocated to a VM; and
store, in each virtual storage component entry representing a virtual storage component, the storage resource information for the storage resource corresponding to the virtual storage component.

13. The non-transitory computer readable medium of claim 9, wherein:
a virtual storage component comprises a virtual hard disk (VHD) or pass-through disk (PTD) allocated to a VM;
a VHD has a device path used by at least one VM to access the VHD, the device path to represent the virtual storage information for the VHD;
a PTD has a device identifier used by the at least one VM to access the PTD, the device identifier to represent the virtual storage information for the PTD;
for each VHD of the at least one VM, the device path of the VHD is used to determine a corresponding storage resource having a matching device path; and
for each PTD of the at least one VM, the device identifier of the PTD is used to determine a corresponding storage resource having a matching device identifier.

14. The non-transitory computer readable medium of claim 9, wherein:
the at least one storage system is coupled to the server through a network; and
the storage resource information for the at least one storage resource further comprises a network address of the at least one storage system and an operating system path of the at least one storage resource.

15. The non-transitory computer readable medium of claim 9, wherein the at least one virtual storage component comprises a storage resource underlying the at least one virtual storage component that stores data for the virtual storage component on the at least one storage system.

16. The non-transitory computer readable medium of claim 9, wherein the instructions, when executed, further cause the system to monitor at least one storage resource associated with a particular VM based at least partially on storage resource information for the particular VM stored in the virtual storage component data structure.

17. A computer-implemented method comprising:
determining at least one virtual storage component allocated to a first virtual machine (VM) identified by a first VM identifier, wherein the VM is hosted on a server, each virtual storage component is associated with virtual storage information comprising a device path or a device identifier, and the virtual storage information is produced by the server for accessing, by the first VM, the at least one virtual storage component;
determining at least one storage resource hosted by at least one storage system and is available to the server, each storage resource is associated with an available device identifier and an available device path;
determining storage resource information for the at least one storage resource based at least partially on the available device identifier by at least sending a device-access query to the at least one storage resource identified by available device identifier, the storage resource information for the at least one storage resource comprising information for locating the at least one storage resource on the at least one storage system; and
storing the storage resource information for the at least one storage resource in at least one virtual storage component entry of a virtual storage component data structure, after determining that the available device identifier or the available device path for the at least one storage resource matches the virtual storage information for the at least one virtual storage component, the at least one virtual storage component entry comprising the first VM identifier, the virtual storage information, and the storage resource information.

18. The method of claim 17, wherein the device-access query comprises a Small Computer Systems Interface (SCSI) query.

19. The method of claim 17, wherein the storage resource information for the at least one storage resource is used for locating the at least one storage resource for providing monitoring, maintenance, or performance optimization for the first storage resource.

20. The method of claim 17, further comprising:
storing the virtual storage information for each virtual storage component allocated to the first VM to the virtual storage component data structure, the virtual storage component data structure comprising a plurality of virtual storage component entries, each virtual storage component entry representing a virtual storage component allocated to a VM; and
storing, in each virtual storage component entry representing a virtual storage component, the storage resource information for the storage resource corresponding to the virtual storage component.

21. The method of claim 17, wherein:
a virtual storage component comprises a virtual hard disk (VHD) or pass-through disk (PTD) allocated to a VM;
a VHD has a device path used by at least one VM to access the VHD, the device path to represent the virtual storage information for the VHD;
a PTD has a device identifier used by the at least one VM to access the PTD, the device identifier to represent the virtual storage information for the PTD;
for each VHD of the at least one VM, the device path of the VHD is used to determine a corresponding storage resource having a matching device path; and
for each PTD of the at least one VM, the device identifier of the PTD is used to determine a corresponding storage resource having a matching device identifier.

22. The method of claim 17, wherein:
the at least one storage system is coupled to the server through a network; and
the storage resource information for the at least one storage resource further comprises a network address of the at least one storage system and an operating system path of the at least one storage resource.

23. The method of claim 17, wherein the at least one virtual storage component comprises a storage resource underlying the at least one virtual storage component that stores data for the virtual storage component on the at least one storage system.

24. The method of claim 17, further comprising monitoring at least one storage resource associated with a particular VM based at least partially on storage resource information for the particular VM stored in the virtual storage component data structure.

* * * * *